US012674348B2

(12) United States Patent
Kintoki et al.

(10) Patent No.: US 12,674,348 B2
(45) Date of Patent: Jul. 7, 2026

(54) DOOR DEVICE OF MACHINE TOOL AND MACHINE TOOL

(71) Applicant: Yamazaki Mazak Corporation, Niwa-gun (JP)

(72) Inventors: Tomohiro Kintoki, Niwa-gun (JP); Kenji Arisue, Niwa-gun (JP); Kenji Hirose, Niwa-gun (JP); Reiji Maekawa, Niwa-gun (JP); Yuki Kaneda, Niwa-gun (JP)

(73) Assignee: YAMAZAKI MAZAK CORPORATION, Niwa-gun (JP)

( * ) Notice: Subject to any disclaimer, the term of this patent is extended or adjusted under 35 U.S.C. 154(b) by 466 days.

(21) Appl. No.: 18/506,140

(22) Filed: Nov. 10, 2023

(65) Prior Publication Data

US 2024/0066649 A1 Feb. 29, 2024

Related U.S. Application Data

(63) Continuation of application No. PCT/JP2021/018311, filed on May 14, 2021.

(51) Int. Cl.
*E05F 15/56* (2015.01)

(52) U.S. Cl.
CPC .................................... *E05F 15/56* (2015.01)

(58) Field of Classification Search
None
See application file for complete search history.

(56) References Cited

U.S. PATENT DOCUMENTS

RE28,639 E * 12/1975 Crocker .................. E05F 15/56 49/137
3,922,814 A * 12/1975 Runft ....................... H01H 1/60 200/279

(Continued)

FOREIGN PATENT DOCUMENTS

CH 616986 A5 * 4/1980 .............. E05F 15/56
CN 107283215 A * 10/2017 ............. B23Q 17/10

(Continued)

OTHER PUBLICATIONS

The International Preliminary Report on Patentability (Chapter I) with translation of Written Opinion for corresponding International Application No. PCT/JP2021/018311, Nov. 23, 2023.

(Continued)

*Primary Examiner* — Catherine A Kelly
(74) *Attorney, Agent, or Firm* — MORI & WARD, LLP

(57) ABSTRACT

A door device includes a door slidable between a first position and a second position; an air cylinder having a first air chamber to which air is supplied to apply a first assist force to the door in a first direction from the first position toward the second position; a fluid passage connecting the first air chamber and an air supply source; a switch valve provided at the fluid passage; and a manipulation switch to switch the switch valve between a first state and a second state. The door, in the first state, is movable in the first direction and a second direction opposite to the first direction without the first assist force. The first assist force is applied to the door in the second state. The door at the first position closes an opening a machine tool. The door at the second position fully opens the opening.

18 Claims, 18 Drawing Sheets

(56) References Cited

U.S. PATENT DOCUMENTS

| | | | | | |
|---|---|---|---|---|---|
| 4,134,231 | A * | 1/1979 | Daugirdas | E05F 15/56 | 49/363 |
| 4,272,923 | A * | 6/1981 | Anderson | B60J 5/06 | 49/404 |
| 5,269,098 | A * | 12/1993 | Redman | E05F 15/56 | 49/360 |
| 5,791,087 | A * | 8/1998 | Strab | E05F 15/56 | 49/360 |
| 6,006,650 | A * | 12/1999 | Adams | E05F 15/56 | 91/461 |
| 7,841,582 | B2 * | 11/2010 | Bang | H10P 72/0441 | 220/240 |
| 10,392,852 | B1 * | 8/2019 | Mastrippolito | E05F 15/50 | |
| 2020/0208453 | A1 | 7/2020 | Makihira et al. | | |

FOREIGN PATENT DOCUMENTS

| | | | | |
|---|---|---|---|---|
| CN | 111379492 | | 7/2020 | |
| CN | 111379492 | A * | 7/2020 | E05F 15/565 |
| DE | 202011050215 | U1 * | 1/2012 | E05F 15/56 |
| EP | 0175194 | | 3/1986 | |
| GB | 2032534 | A * | 5/1980 | E05F 15/56 |
| JP | H10-061312 | | 3/1998 | |
| JP | H11-138384 | | 5/1999 | |
| JP | 2002-309853 | | 10/2002 | |
| JP | 2006-205337 | | 8/2006 | |
| JP | 2015-054383 | | 3/2015 | |
| JP | 6104770 | B2 | 3/2015 | |
| KR | 20090060526 | | 6/2009 | |
| KR | 20130085684 | A * | 7/2013 | E05F 3/02 |
| KR | 101434671 | B1 | 8/2014 | |
| KR | 102067703 | B1 | 2/2020 | |
| KR | 20200088711 | | 7/2020 | |
| KR | 102168537 | B1 | 10/2020 | |
| NL | 2018423 | B1 * | 9/2018 | E05F 15/53 |

OTHER PUBLICATIONS

International Search Report for corresponding International Application No. PCT/JP2021/018311, Aug. 3, 2021.

Written Opinion for corresponding International Application No. No. PCT/JP2021/018311, Aug. 3, 2021.

Japanese Office Action for corresponding JP Application No. 2021-552799, Nov. 2, 2021, (w/ English machine translation).

Chinese Office Action for corresponding CN Application No. 202180097766.4, Aug. 13, 2025 (w/ machine translation).

Supplementary European search report for corresponding EP Application No. 21941946.2-1005, Sep. 11, 2024.

European Office Action for corresponding EP Application No. 21941946.2-1005, Sep. 23, 2024.

European Office Action for corresponding EP Application No. 21941946.2, Mar. 25, 2025.

Partial supplementary European search report for corresponding EP Application No. 21941946.2-1005, May 10, 2024.

* cited by examiner

DOOR DEVICE OF MACHINE TOOL AND MACHINE TOOL

CROSS-REFERENCE TO RELATED APPLICATIONS

The present application is a continuation application of International Application No. PCT/JP2021/018311, filed May 14, 2021. The contents of this application are incorporated herein by reference in their entirety.

BACKGROUND OF THE INVENTION

Field of the Invention

The present invention relates to a door device of a machine tool, and a machine tool.

Discussion of the Background

Aid devices to aid opening and closing of doors of machine tools are known.

As a related technique, Japanese Patent Application Laid-Open No. Hei 10-61312 discloses a door open-close aid device. The door open-close aid device includes a fluid pressure source, a fluid pressure actuator that applies an aid driving force to aid an open-close operation performed by a manual force, adjusting means for changing and/or adjusting the amount of flow of a working fluid supplied from the fluid pressure source to the fluid pressure actuator and changing and/or adjusting the direction or pressure of the working fluid, and a door handle mounted on the openable-closable door in a manner in which the door handle is movable in a direction in which the manual force is applied. The adjusting means is connected to the door handle in a manner in which the adjusting means operates together with a manipulation of the door handle. When the door handle is manipulated to an open side, the adjusting means supplies the working fluid to the fluid pressure actuator in a direction in which the openable-closable door is moved to the open side. When the door handle is manipulated to a closed side, the adjusting means supplies the working fluid to the fluid pressure actuator in a direction in which the openable-closable door is moved to the closed side.

SUMMARY OF THE INVENTION

According to one aspect of the present invention, a door device of a machine tool includes a door provided to be slidable between a first position and a second position; an air cylinder having a first air chamber to which air is configured to be supplied so as to apply a first assist force to the door in a first direction from the first position toward the second position; a fluid passage having a first fluid passage connecting the first air chamber and an air supply source; a switch valve provided at the fluid passage; and a manipulation switch configured to switch a state of the switch valve between a first state and a second state. The door, in the first state, is movable in the first direction and a second direction opposite to the first direction without the first assist force. The first assist force is applied to the door in the second state. The door at the first position is configured to close an opening in a housing of the machine tool. The door at the second position is configured to fully open the opening.

According to another aspect of the present invention, a machine tool includes a machining device configured to machine a workpiece; a workpiece support device configured to support the workpiece; a housing surrounding the machining device and the workpiece support device and having an opening; and a door device. The door device includes a door provided to be slidable between a first position and a second position; an air cylinder having a first air chamber to which air is configured to be supplied so as to apply a first assist force to the door in a first direction from the first position toward the second position; a fluid passage having a first fluid passage connecting the first air chamber and an air supply source; a switch valve provided at the fluid passage; and a manipulation switch configured to switch a state of the switch valve between a first state and a second state. The door, in the first state, is movable in the first direction and a second direction opposite to the first direction without the first assist force. The first assist force is applied to the door in the second state. The door at the first position is configured to close an opening in a housing of the machine tool. The door at the second position is configured to fully open the opening.

BRIEF DESCRIPTION OF DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
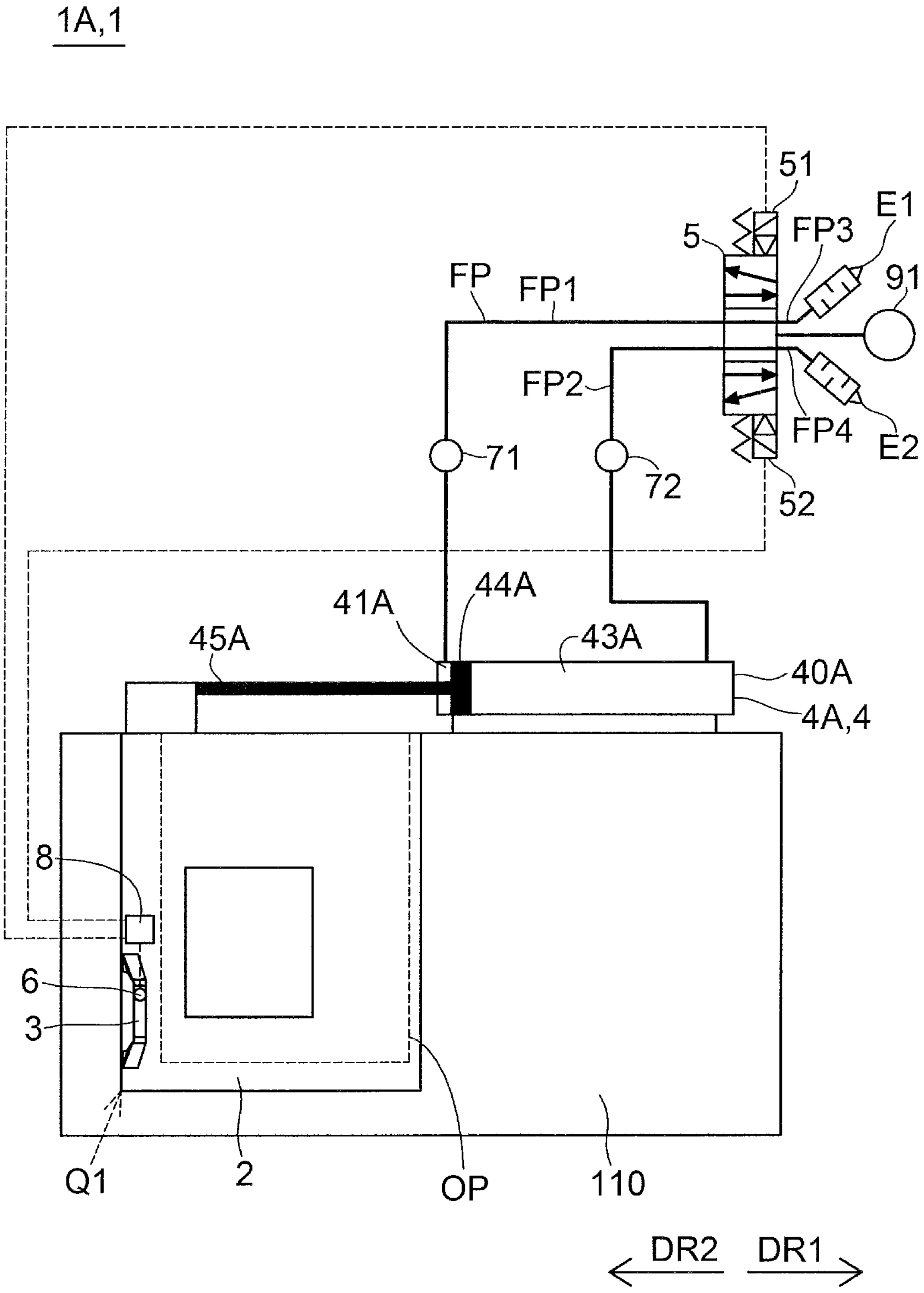
FIG. 1 is a diagram schematically illustrating a door device according to a first embodiment for a machine tool.

By referring to the accompanying drawings, description will be made with regard to a door device 1 according to an embodiment for a machine tool, and with regard to a machine tool 100 according to the embodiment. It is noted that in the following description of the embodiments, identical reference numerals are used to denote identical portions, members, or components having identical functions, and redundant description of identical portions, members, or components will be eliminated or minimized.

First Embodiment

Figure 5:
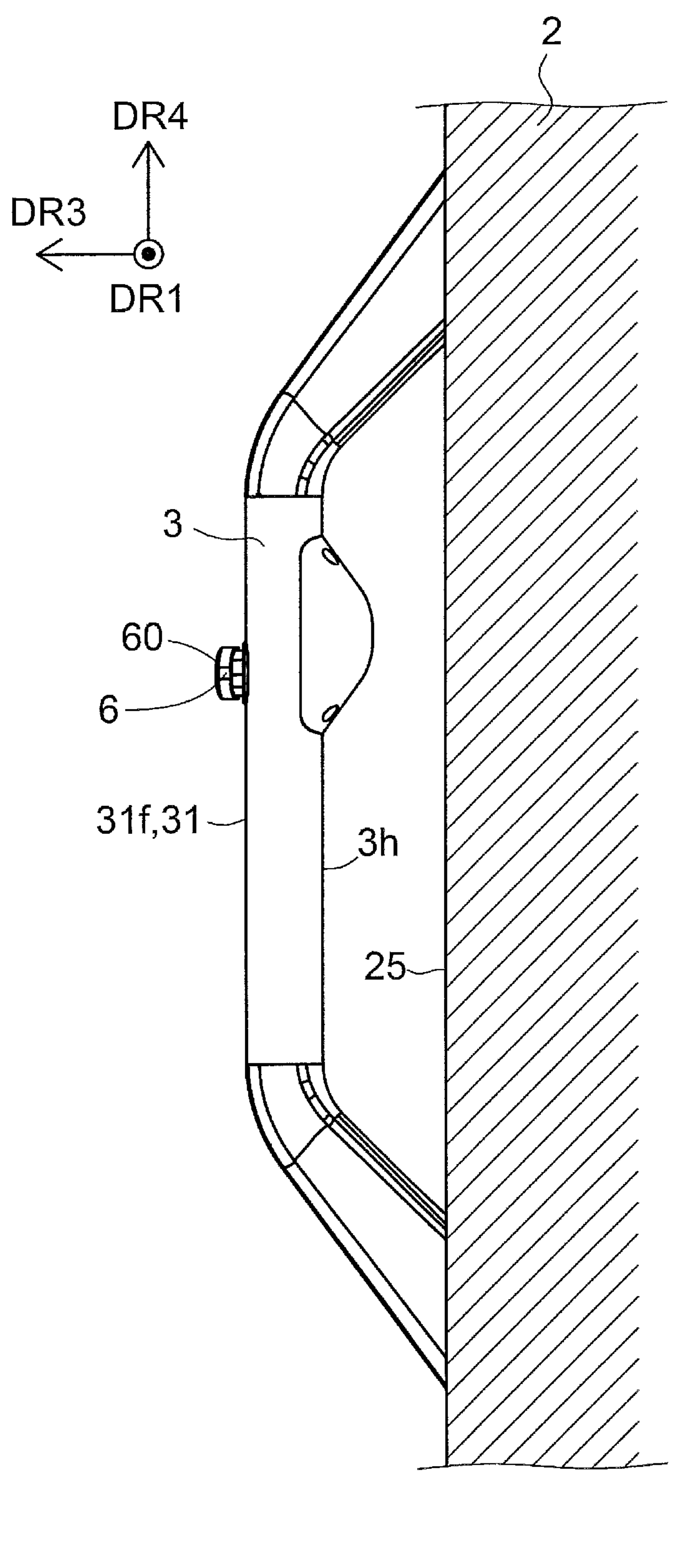
FIG. 5 is a diagram schematically illustrating an example installation of a manipulation switch.
Figure 6:
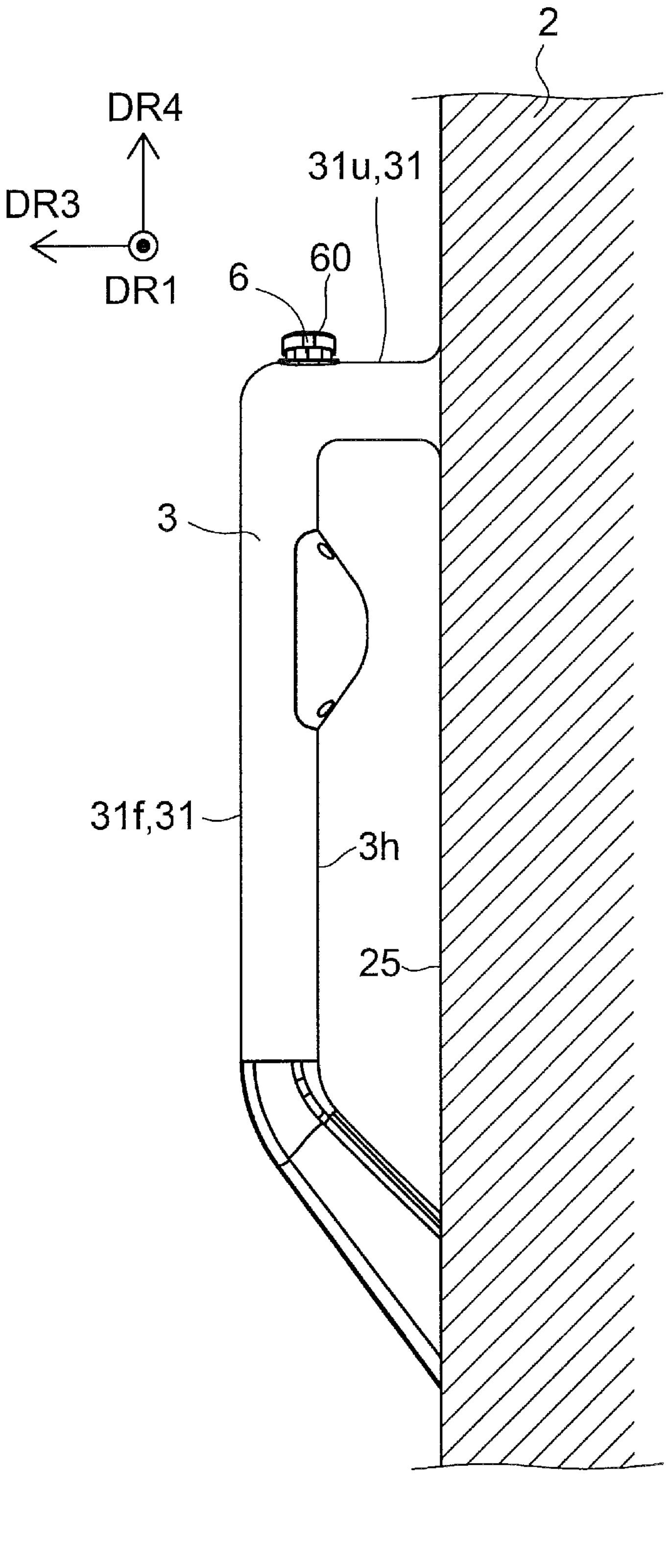
FIG. 6 is a diagram schematically illustrating another example installation of the manipulation switch.
Figure 7:
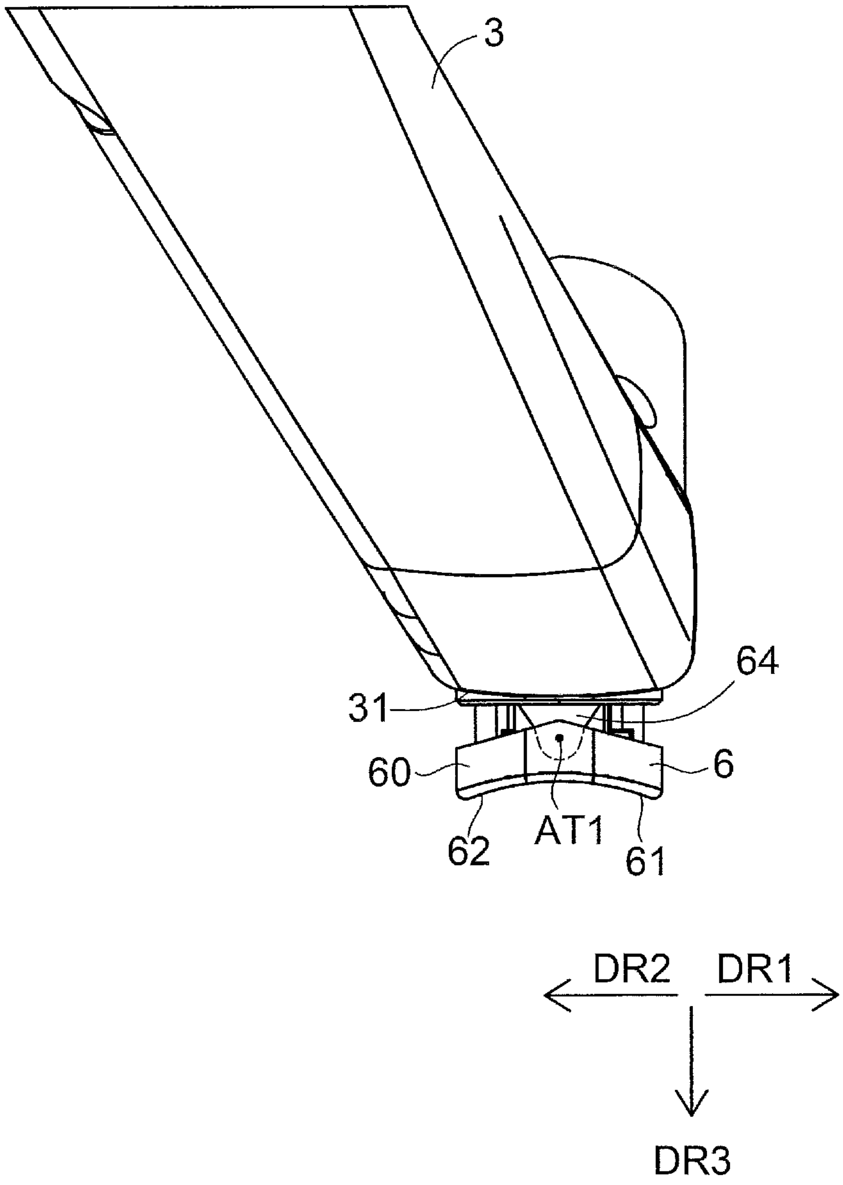
FIG. 7 is a schematic plan view of an example handle.
Figure 8:
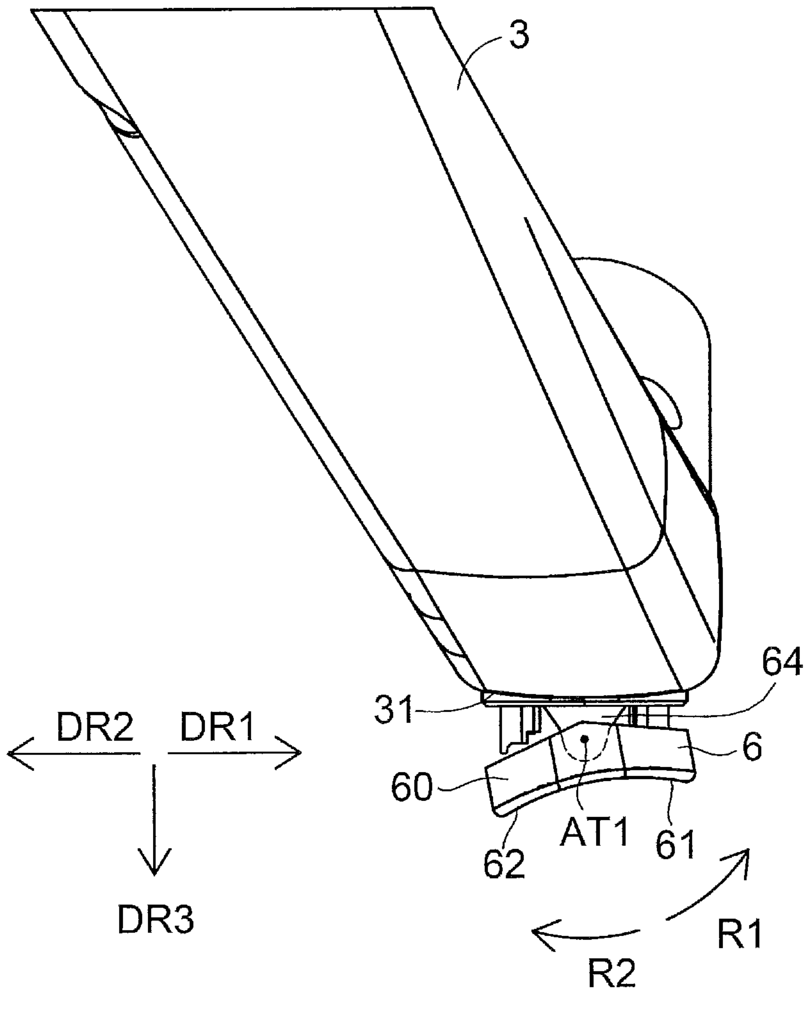
FIG. 8 is a schematic plan view of an example handle.
Figure 9:
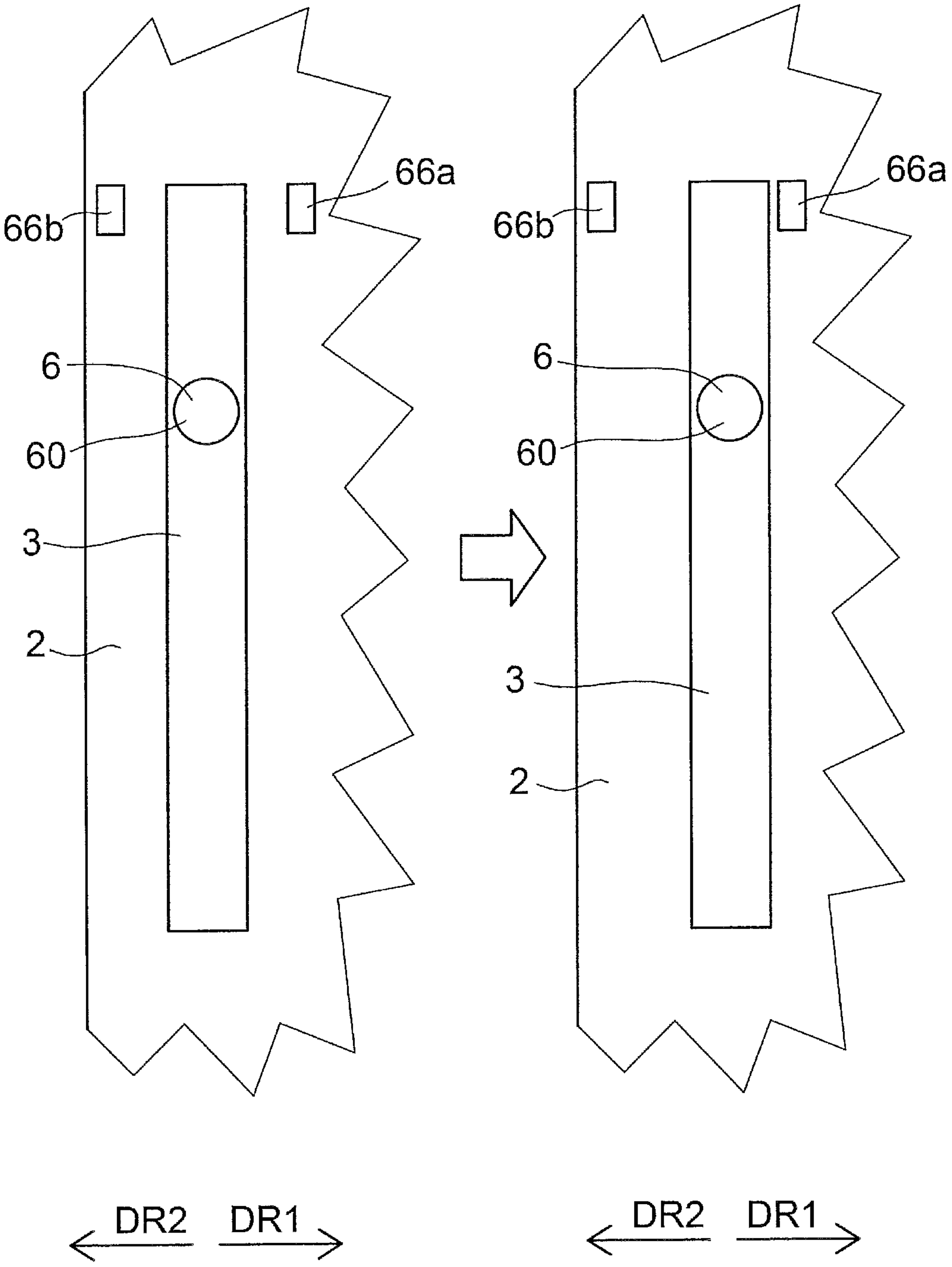
FIG. 9 is a diagram schematically illustrating a modification of a manipulation switch.
Figure 10:
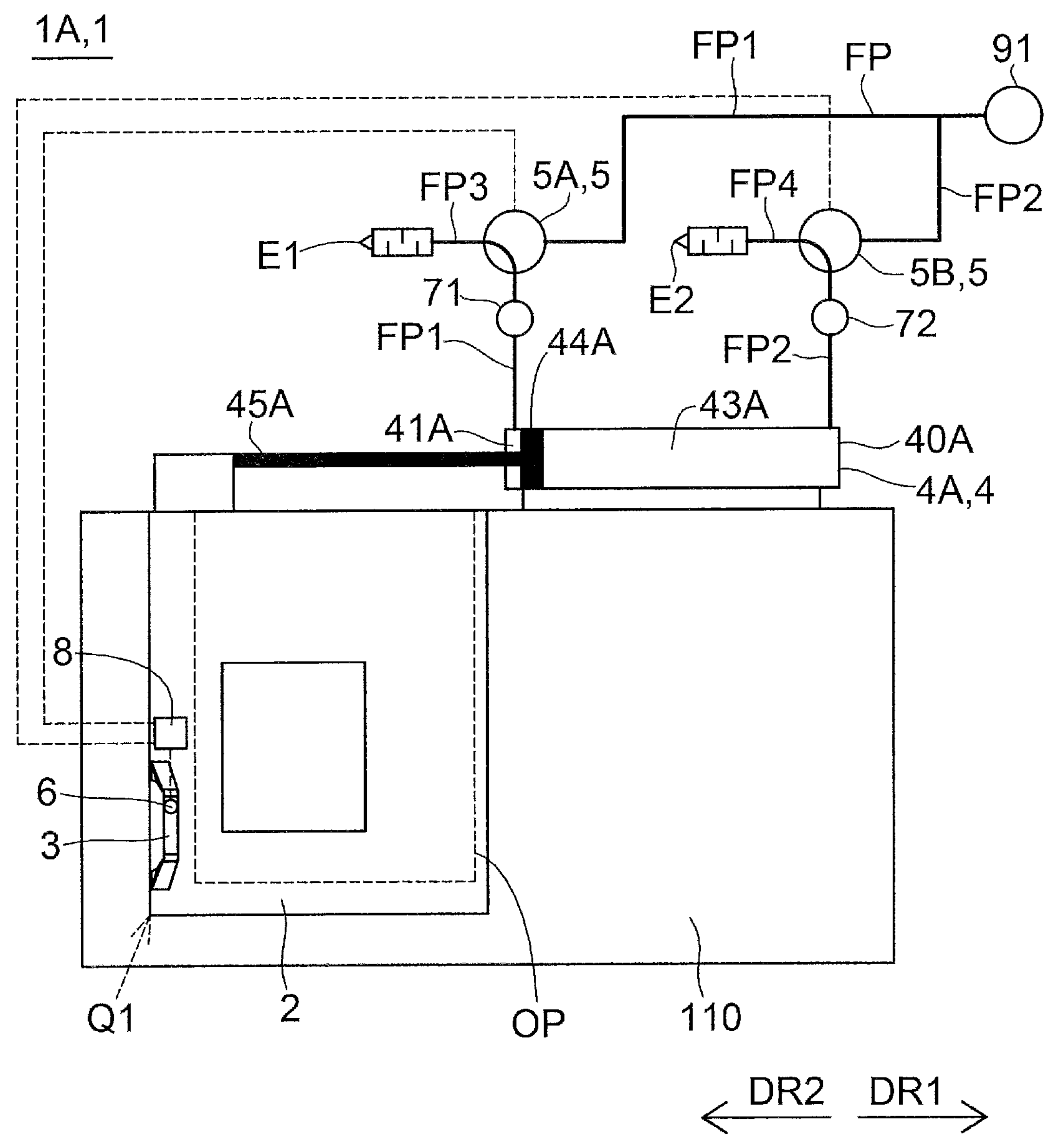
FIG. 10 is a diagram schematically illustrating a door device according to a first modification of the first embodiment for a machine tool.
Figure 11:
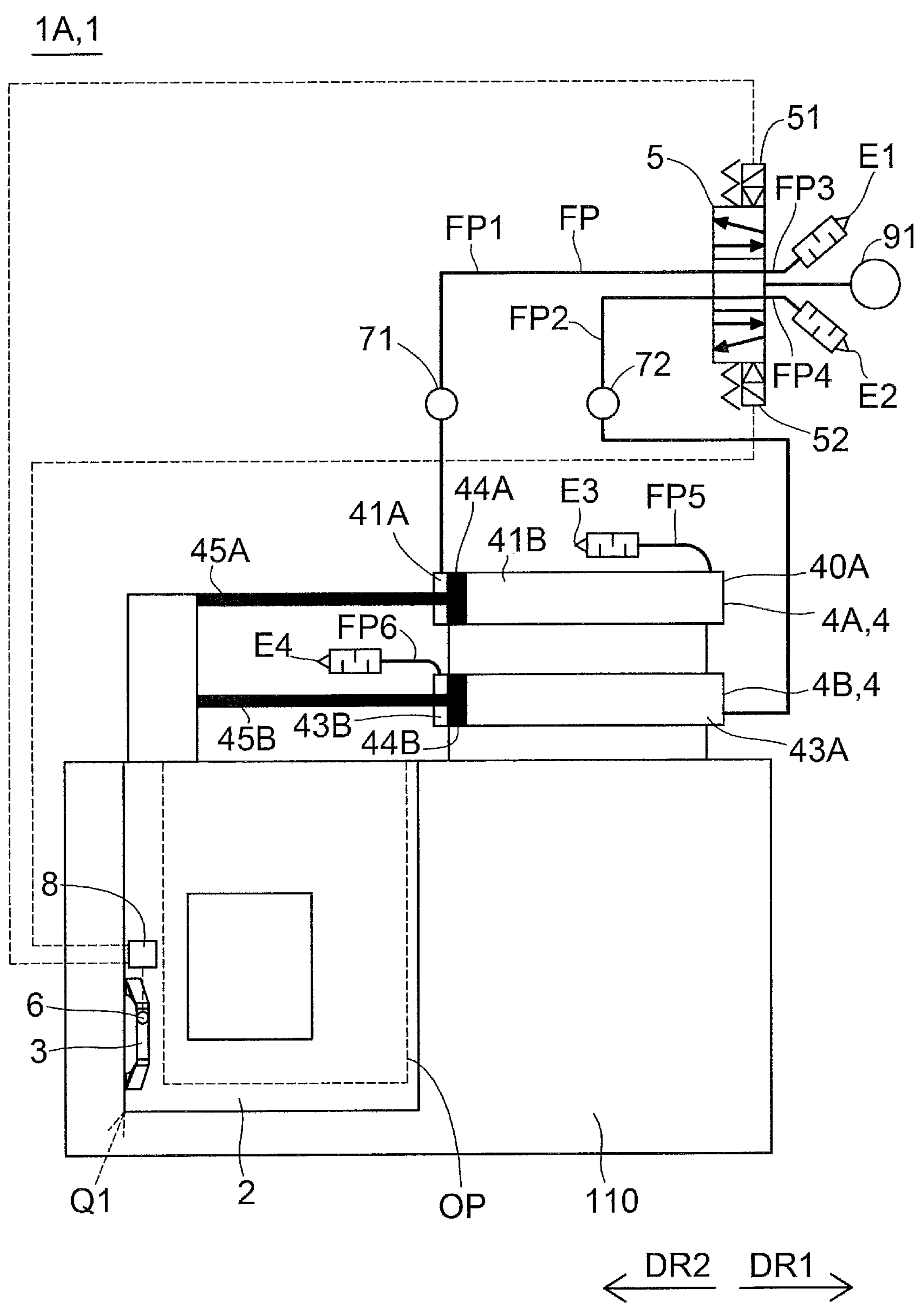
FIG. 11 is a diagram schematically illustrating a door device according to a second modification of the first embodiment for a machine tool.
Figure 12:
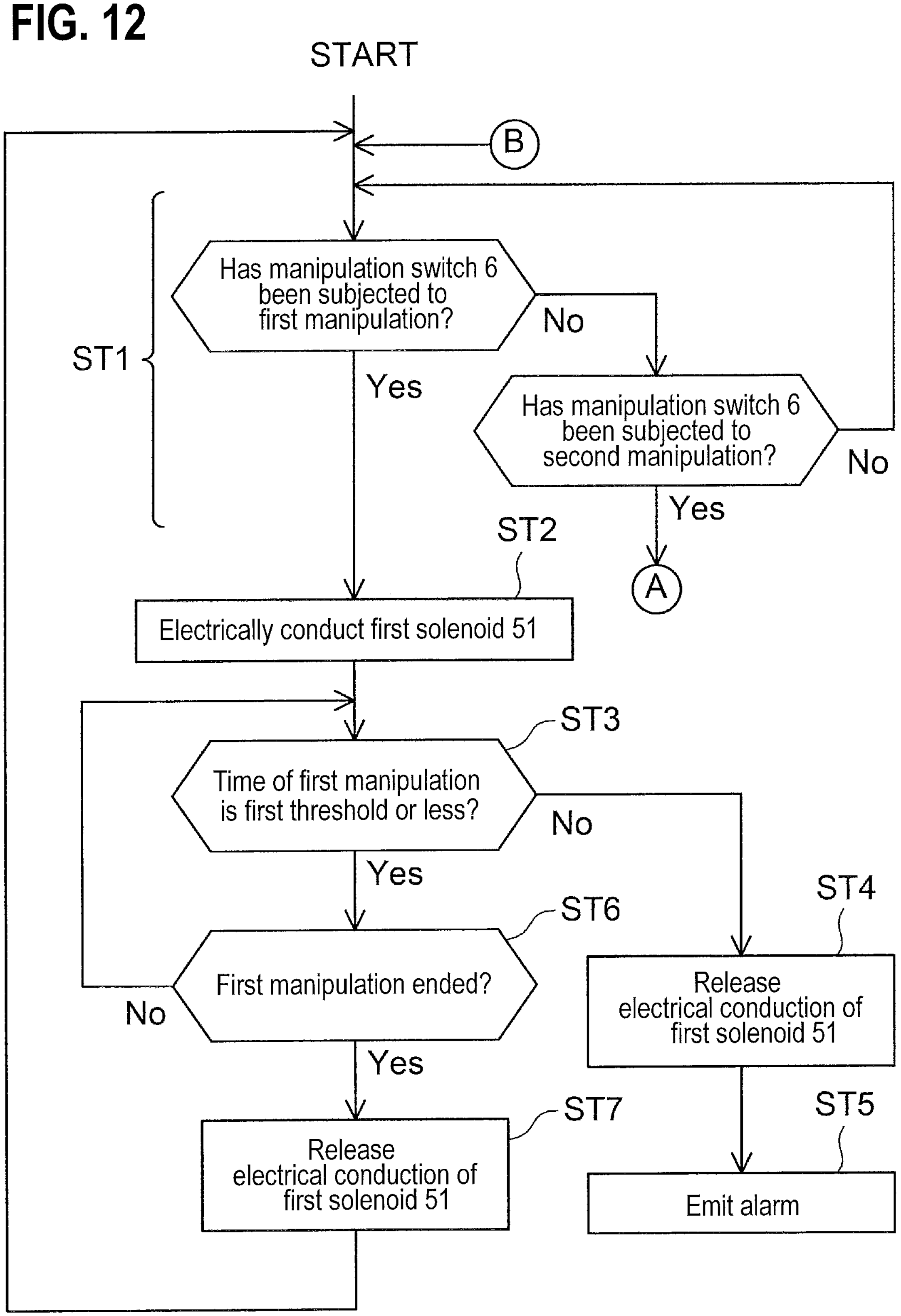
FIG. 12 illustrates an example control flow of a motion of a switch valve.
Figure 13:
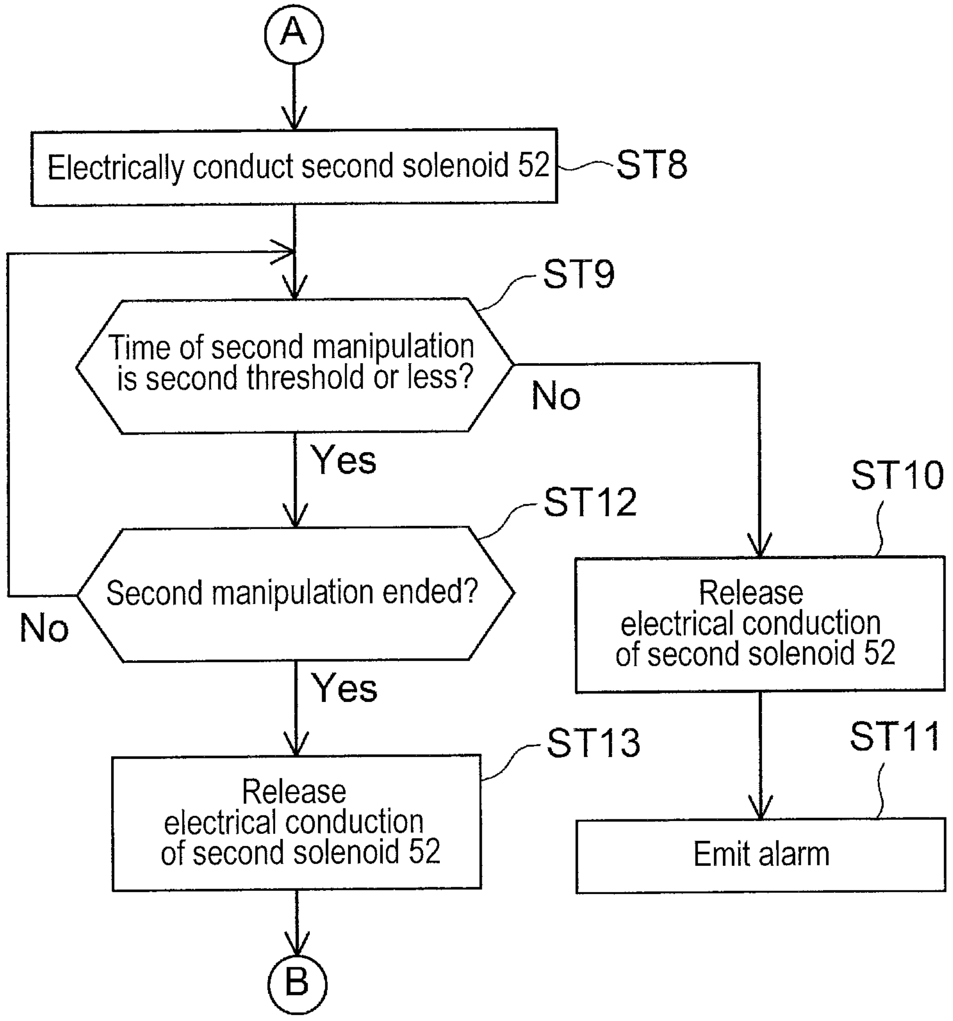
FIG. 13 illustrates an example control flow of a motion of the switch valve.

By referring to FIGS. 1 to 13, a door device 1A according to the first embodiment for a machine tool will be described. FIGS. 1 to 4 are diagrams schematically illustrating the door device 1A according to the first embodiment for a machine tool. FIG. 5 is a diagram schematically illustrating an example installation of a manipulation switch 6. FIG. 6 is a diagram schematically illustrating another example installation of the manipulation switch 6. FIGS. 7 and 8 are schematic plan views of an example handle 3. FIG. 9 is a diagram schematically illustrating a modification of the manipulation switch 6. FIG. 10 is a diagram schematically illustrating a door device 1A according to a first modification of the first embodiment for a machine tool. FIG. 11 is a diagram schematically illustrating a door device 1A according to a second modification of the first embodiment for a machine tool. FIGS. 12 and 13 illustrate example control flows of a motion of a switch valve 5.

As exemplified in FIG. 1, the door device 1A according to the first embodiment includes a door 2, the handle 3, air cylinder 4, a fluid passage FP, the switch valve 5, and the manipulation switch 6.

Figure 3:
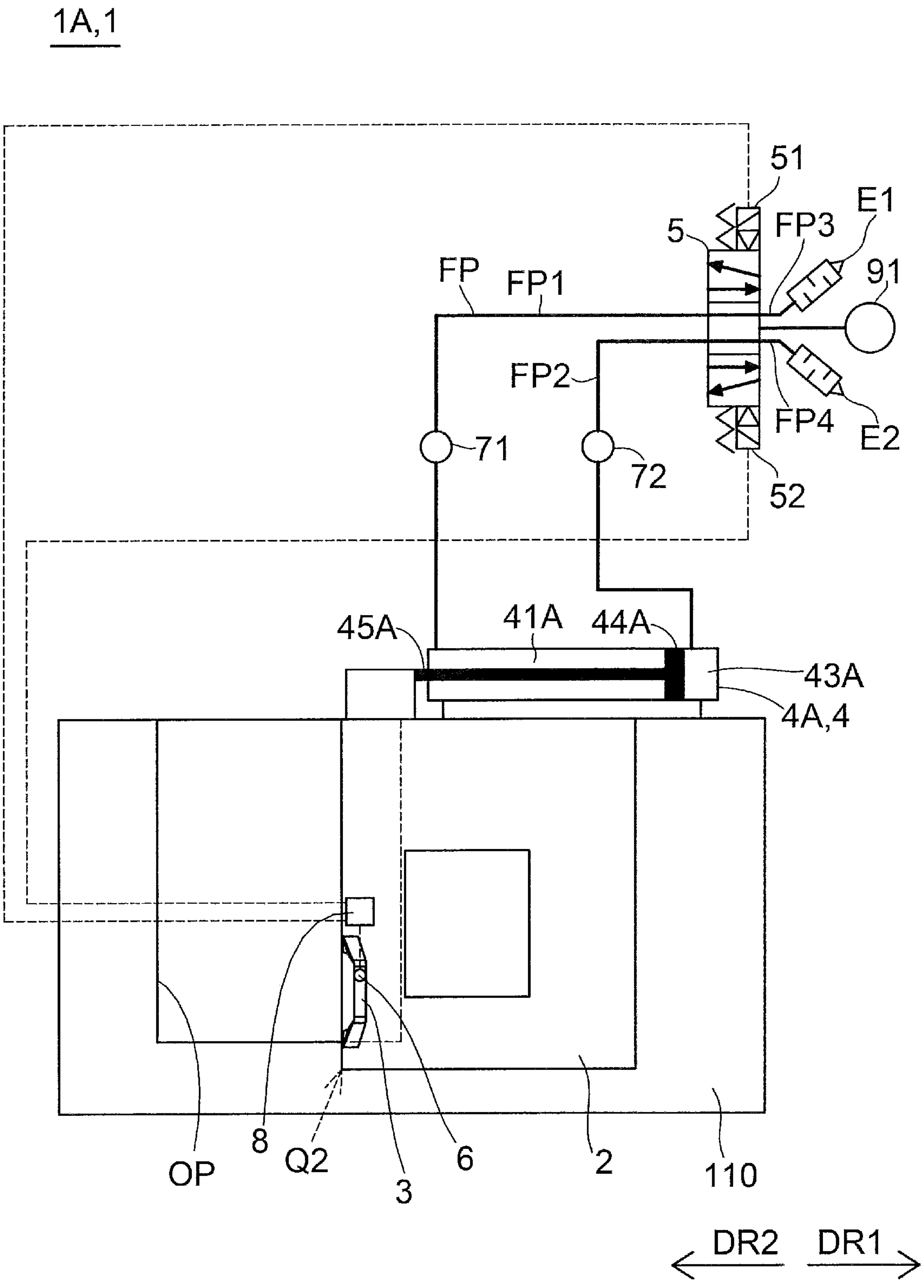
FIG. 3 is a diagram schematically illustrating the door device according to the first embodiment for a machine tool.

The door 2 is slidable between a first position Q1 and a second position Q2. The first position Q1 (see FIG. 1) is a position at which the door 2 closes an opening OP of a housing 110, which defines the inner region of the machine tool. The second position Q2 (see FIG. 3) is a position at which the door 2 fully opens the opening OP. As shown in FIG. 3, when the door 2 fully opens the opening OP at the second position Q2, the opening area opened by the door 2 is maximum. The direction from the first position Q1 toward the second position Q2 is defined as first direction DR1, and the direction from the second position Q2 toward the first position Q1 is defined as second direction DR2. The door 2 is slidable in the first direction DR1 and slidable in the second direction DR2. In the example illustrated in FIG. 1, the first direction DR1 and the second direction DR2 are directions parallel to horizontal direction.

The handle 3 is provided at the door 2. The handle 3 may be a knob mounted on the door 2 or may be a depression provided in part of the door 2. In the example illustrated in FIG. 1, the handle 3 is manipulated in the first direction DR1, and the door 2 is moved from the first position Q1 toward the second position Q2. Also in the example illustrated in FIG. 3, the handle 3 is manipulated in the second direction DR2 (in other words, the direction opposite to the first direction DR1), and the door 2 is moved from the second position Q2 toward the first position Q1.

The air cylinder 4 includes a first air chamber 41A. By receiving air supplied into the first air chamber 41A, the air cylinder 4 applies a first assist force to the door 2 in the first direction DR1. In the example illustrated in FIG. 1, air can be supplied into the first air chamber 41A from the air supply source 91.

The air cylinder 4 may include a second air chamber 43A. By receiving air supplied into the second air chamber 43A, the air cylinder 4 applies a second assist force to the door 2 in the second direction DR2. In the example illustrated in FIG. 1, air can be supplied into the second air chamber 43A from the air supply source 91.

In the example illustrated in FIG. 1, the air cylinder 4 includes a first air cylinder 4A. It is the first air cylinder 4A that includes both the first air chamber 41A and the second air chamber 43A.

The fluid passage FP includes a first fluid passage FP1. The first fluid passage FP1 connects the first air chamber 41A and the air supply source 91 to each other. The fluid passage FP may include a second fluid passage FP2. The second fluid passage FP2 connects the second air chamber 43A and the air supply source 91 to each other. As exemplified in FIG. 1, part of the first fluid passage FP1 and part of the second fluid passage FP2 may be commonized (in the example illustrated in FIG. 1, the part defined between the air supply source 91 and the switch valve 5 is common to the first fluid passage FP1 and the second fluid passage FP2). Alternatively, the first fluid passage FP1 and the second fluid passage FP2 may be completely independent of each other. In the example illustrated in FIG. 1, the switch valve 5 is provided at the fluid passage FP.

Figure 2:
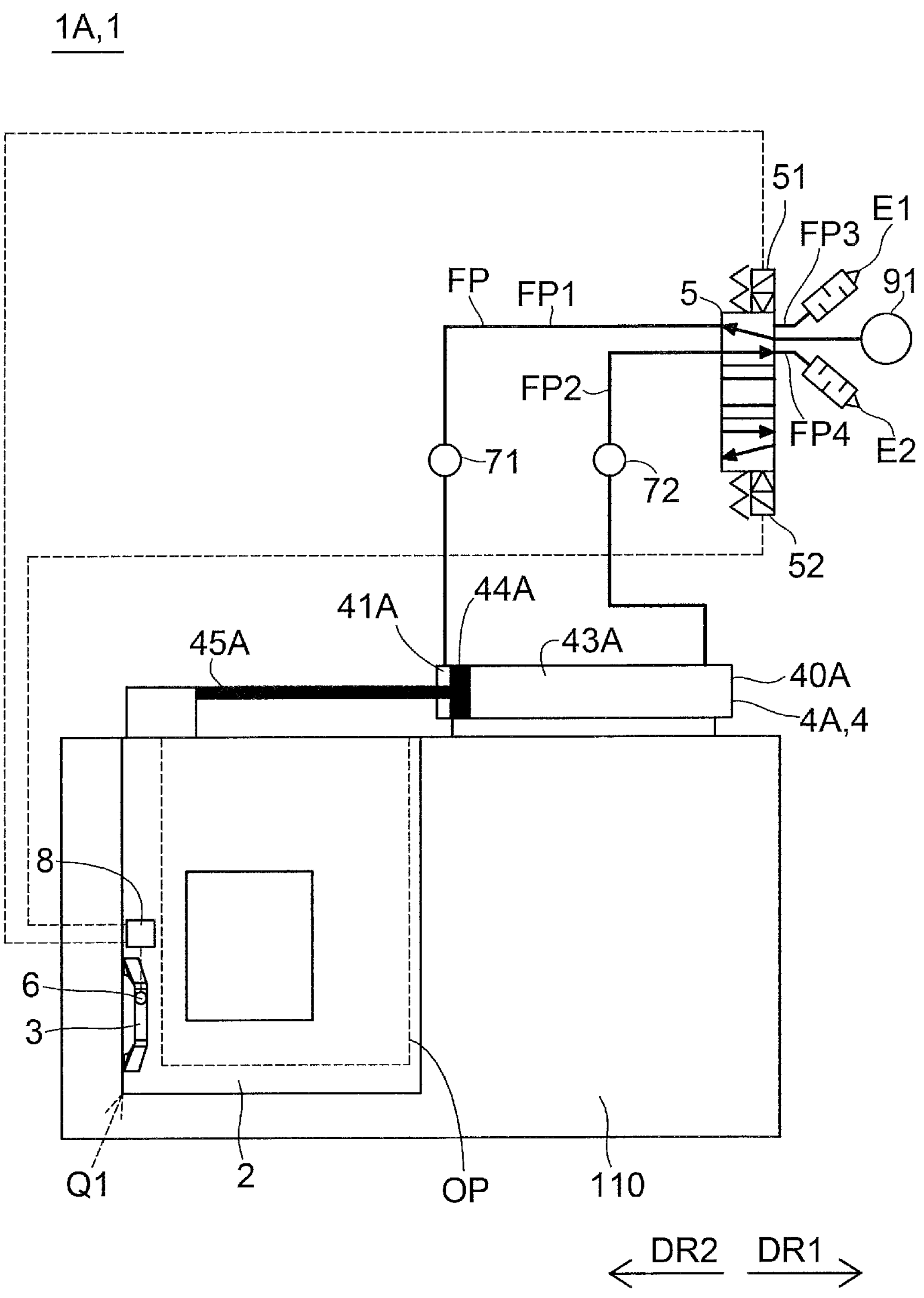
FIG. 2 is a diagram schematically illustrating the door device according to the first embodiment for a machine tool.

The manipulation switch 6 switches the state of the switch valve 5 between the first state exemplified in FIG. 1 and the second state exemplified in FIG. 2.

In the first state exemplified in FIG. 1, the door 2 is permitted to move in the first direction DR1 or the second direction DR2 without the first assist force. In the example illustrated in FIG. 1, in the first state, the switch valve 5 fluidally connects the first air chamber 41A to a first atmosphere release hole E1, through which the air inside the first air chamber 41A is released. In this case, when a worker manipulates the handle 3 in the first direction DR1, the door 2 is moved from the first position Q1 toward the second position Q2 without the first assist force. It is to be noted that as exemplified in FIG. 1, in the first state, the switch valve 5 may fluidally connect the second air chamber 43A to a second atmosphere release hole E2, through which the air inside the second air chamber 43A is released.

In the second state exemplified in FIG. 2, the first assist force is applied to the door 2 in the first direction DR1. In the example illustrated in FIG. 2, in the second state, the switch valve 5 fluidally connects the air supply source 91 and the first air chamber 41A to each other to cause air to be supplied into the first air chamber 41A. In this case, if the worker manipulates the handle 3 in the first direction DR1, the door 2 is moved from the first position Q1 toward the second position Q2 by a combination of the first assist force and the manipulation force of the worker. It is to be noted that as exemplified in FIG. 2, in the second state, the switch valve 5 may fluidally connect the second atmosphere release hole E2 and the second air chamber 43A to each other.

In the first embodiment, the door device 1A for a machine tool is capable of switching the state of the switch valve 5 between the first state and the second state. In the first state, the door 2 is permitted to move in the first direction DR1 or the second direction DR2 without the first assist force. In the second state, the first assist force is applied to the door 2 in the first direction DR1. With this configuration of the first embodiment, the door device 1A for a machine tool is easy to use for both a worker who needs an assist force and a worker who does not need an assist force. More specifically, the door device 1A for a machine tool is configured with universal design taken into consideration to enable any worker to operate the door device and the machine tool while taking any posture and performing any type of work. Also, the door device 1A according to the first embodiment for a machine tool includes the manipulation switch 6, which switches the state of the switch valve 5 between the first state and the second state. This enables the worker to select the first state or the second state on the worker's own will. For example, a worker who does not need an assist force may select the first state to open the door 2 as if to open a usual door without assist functions, ensuring no or minimal degradation of work efficiency. Also, a worker who needs an assist force may select the second state to open the door 2 with a small degree of force.

In the first state (see FIG. 1), the air chamber of the air cylinder 4 is fluidally connected to an atmosphere release hole. This ensures that even if the motive power source is disconnected (more specifically, even if air can not be supplied from the air supply source 91 to the fluid passage FP), the door 2 can be moved freely in the first direction DR1 or the second direction DR2.

In the second state (see FIG. 1), the second air chamber 43A of the air cylinder 4 may be fluidally connected to the second atmosphere release hole E2. In this case, by increasing the manipulation force applied to the handle 3 in the first direction DR1, the movement speed of the door 2 can be increased. In other words, insofar as the speed of air supply to the first air chamber 41A is less than a threshold value, the presence of the mechanism to apply assist force does not interfere with the increase in the movement speed of the door 2. In this case, the worker is able to realize utilizing the assist force and quickly opening the door 2 simultaneously.

In the examples illustrated in FIGS. 1 and 2, the door 2 located at the first position Q1 can be moved to any desired position between the first position Q1 and the second position Q2 and stopped at the desired position. Also in the examples illustrated in FIGS. 1 and 2, when the door 2 stopped at the desired position between the first position Q1 and the second position Q2 is moved again, the worker is able to move the door 2 without the first assist force. Also when the door 2 stopped at the desired position between the first position Q1 and the second position Q2 is moved again, the worker is able to move the door 2 by manipulating the manipulation switch 6 to utilize the first assist force.

Optional Configurations

Next, by referring to FIGS. 1 to 13, description will be made with regard to optional configurations employable in the door device 1A according to the first embodiment for a machine tool or in a door device 1B, described later, according to the second embodiment for a machine tool.

Degree of First Assist Force

The first assist force may be smaller in degree than the force necessary for sliding the door 2. In other words, the first assist force may be set to a degree at which the door 2 can not be moved in the first direction DR1 without an additional force other than the first assist force. In this case, in the state of the first assist force being applied, the position of the door 2 remains unchanged unless the worker applies a force to the handle 3. Alternatively, the first assist force may be set to a degree at which the door 2 can be moved at low speed in the first direction DR1 with the first assist force alone. The degree of the first assist force may be adjusted by, for example, changing a first set pressure of a first regulator 71, described later.

Application of Second Assist Force

In the example illustrated in FIG. 3, the air cylinder 4 (more specifically, the first air cylinder 4A) includes the second air chamber 43A. By receiving air supplied into the second air chamber 43A, the air cylinder 4 applies a second assist force to the door 2 in the second direction DR2. In order to ensure air supply into the second air chamber 43A, the fluid passage FP includes the second fluid passage FP2, which connects the second air chamber 43A and the air supply source 91 to each other.

The manipulation switch 6 is capable of switching the state of the switch valve 5 between the first state and a third state. In the first state (see FIG. 1), the door 2 is permitted to move in the first direction DR1 or the second direction DR2 without the first assist force and the second assist force. In the third state (see FIG. 1), the second assist force is applied to the door 2 in the second direction DR2.

In the first state exemplified in FIG. 3, the door 2 is permitted to move in the first direction DR1 or the second direction DR2 without the first assist force and the second assist force. In the example illustrated in FIG. 3, in the first state, the switch valve 5 fluidally connects the first air chamber 41A to the first atmosphere release hole E1, through which the air inside the first air chamber 41A is released. The switch valve 5 also fluidally connects the second air chamber 43A to the second atmosphere release hole E2, through which the air inside the second air chamber 43A is released. In this case, if the worker manipulates the handle 3 in the second direction DR2, the door 2 is moved from the second position Q2 toward the first position Q1 without the second assist force.

Figure 4:
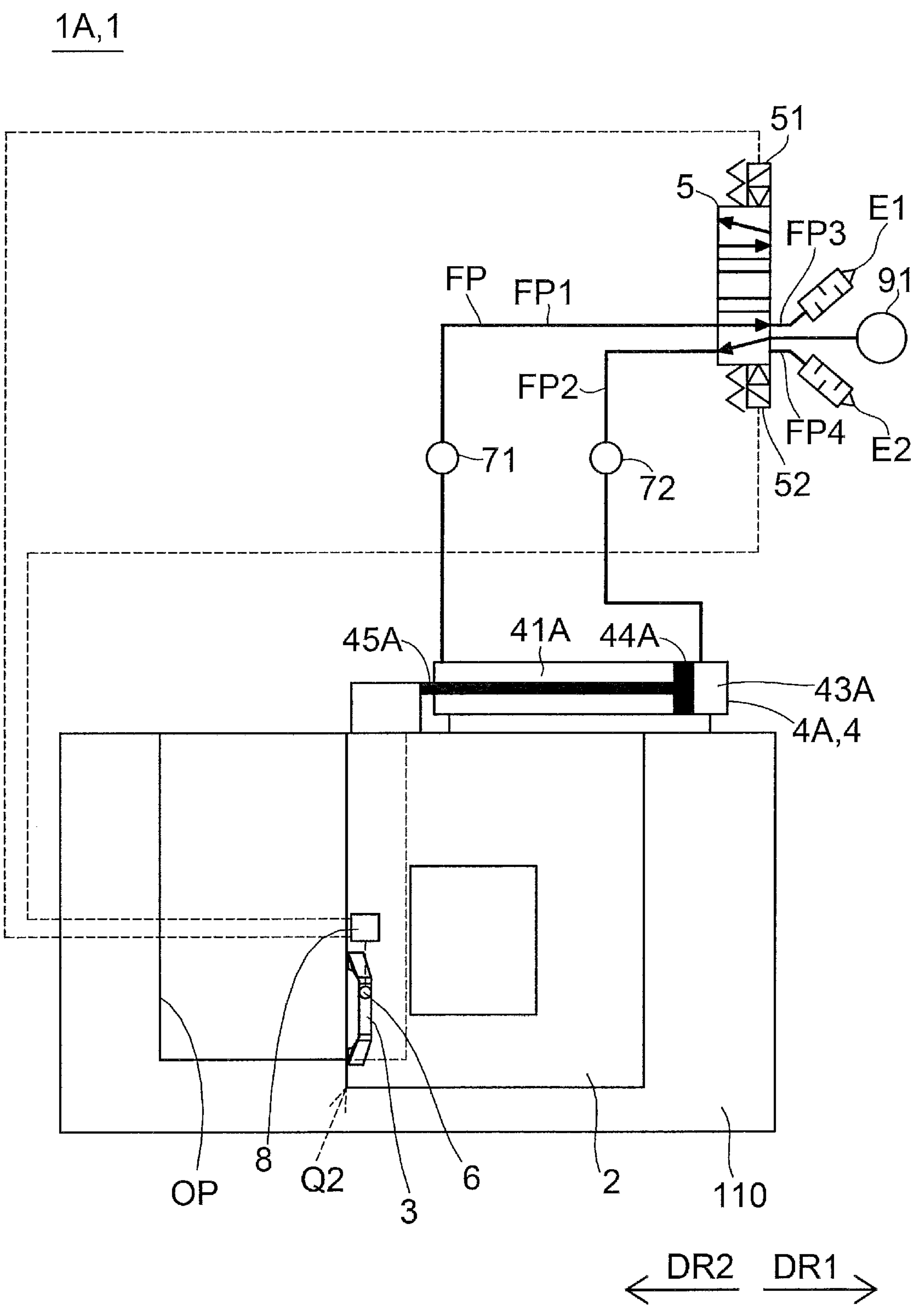
FIG. 4 is a diagram schematically illustrating the door device according to the first embodiment for a machine tool.

In the third state exemplified in FIG. 4, the second assist force is applied to the door 2 in the second direction DR2. In the example illustrated in FIG. 4, in the third state, the switch valve 5 fluidally connects the first atmosphere release hole E1 and the first air chamber 41A to each other, and fluidally connects the air supply source 91 and the second air chamber 43A to each other. In this case, if the worker manipulates the handle 3 in the second direction DR2, the door 2 is moved from the second position Q2 toward the first position Q1 by a combination of the second assist force and the manipulation force of the worker.

In the example illustrated in FIG. 3, a worker who does not need an assist force may select the first state to close the door 2 as if to close a usual door without assist functions, ensuring no or minimal degradation of work efficiency. Also, a worker who needs an assist force may select the third state to close the door 2 with a small degree of force.

In the third state (see FIG. 1), the first air chamber 41A of the air cylinder 4 and the first atmosphere release hole E1 are fluidally connected to each other. With this configuration, by increasing the manipulation force applied to the handle 3 in the second direction DR2, the movement speed of the door 2 can be increased. This enables the worker to realize utilizing the assist force and quickly closing the door 2 simultaneously.

Also in the examples illustrated in FIGS. 3 and 4, the door 2 located at the second position Q2 can be moved to any desired position between the second position Q2 and the first position Q1 and stopped at the desired position. Also in the examples illustrated in FIGS. 3 and 4, when the door 2 stopped at the desired position between the second position Q2 and the first position Q1 is moved again, the worker is able to move the door 2 without the first assist force and the second assist force. Also when the door 2 stopped at the desired position between the second position Q2 and the first position Q1 is moved again, the worker is able to move the door 2 in the first direction DR1 or the second direction DR2 by manipulating the manipulation switch 6 to use the first assist force or the second assist force.

Degree of Second Assist Force

The second assist force may be smaller in degree than the force necessary for sliding the door 2. In other words, the second assist force may be set to a degree at which the door 2 can not be moved in the second direction DR2 without an additional force other than the second assist force. In this case, in the state of the second assist force being applied, the position of the door 2 remains unchanged unless the worker applies a force to the handle 3. Alternatively, the second assist force may be set to a degree at which the door 2 can be moved at low speed in the second direction DR2 with the second assist force alone. The degree of second assist force may be adjusted by, for example, changing a second set pressure of a second regulator 72, described later.

Manipulation Switch 6

In the examples illustrated in FIGS. 1 to 4, all manipulations of the manipulation switch 6 are performable independently of the manipulation of the handle 3. In other words, in the examples illustrated in FIGS. 1 to 4, the manipulation switch 6 is not manipulated together with a manipulation of the handle 3. This provides a greater degree of freedom on the timing to switch the state between the first state and the second state (or the third state). For example, before the handle 3 is manipulated in the first direction DR1 (or the second direction DR2), the manipulation switch 6 may be manipulated to switch the state of the switch valve 5 from the first state to the assisted second state (or the assisted third state). Also, while the door 2 is being moved, the manipulation switch 6 may be manipulated (for example, fingers may be removed from the manipulation switch 6) to switch the state of the switch valve 5 from the second state or the third state to the no-assist first state. In other words, it is possible to use an assist force until the movement speed of the door 2 reaches a predetermined speed and then stop using the assist force.

In the example illustrated in FIG. 5, the manipulation switch 6 is provided at the handle 3 to simultaneously realize holding the handle 3 by the hand and manipulating the manipulation switch 6 using a finger of the hand holding the handle 3 (for example, the thumb). Thus, the motion of holding the handle 3 and the motion of manipulating the manipulation switch 6 are performable approximately simultaneously. As a result, the handle 3 and the manipulation switch 6 are efficiently manipulated.

A direction perpendicular to a main surface 25 of the door 2 pointed from the inside of the door 2 toward the outside of the door 2 is defined as third direction DR3. In this case, in the example illustrated in FIG. 5, the manipulation switch 6 is provided on a surface 31*f* of the handle 3. The surface 31*f* is on the third direction DR3 side of the handle 3 (in other words, its front-side surface). An alternative example is illustrated in FIG. 6. A direction pointed perpendicularly upward is defined as fourth direction DR4. In this case, the manipulation switch 6 may be provided on a surface 31*u* of the handle 3. The surface 31*u* is on the fourth direction DR4 side of the handle 3 (in other words, the upper surface of the handle 3). In the example illustrated in FIG. 6 as well, holding the handle 3 by the hand and manipulating the manipulation switch 6 using a finger of the hand holding the handle 3 (for example, the thumb) are simultaneously realized.

In the examples illustrated in FIGS. 5 and 6, an open area 3*h* is formed between the handle 3 and the door 2. The open area 3*h* is for four fingers of the worker to insert (the four fingers are forefinger, middle finger, ring finger, and little finger). In the examples illustrated in FIGS. 5 and 6, the manipulation switch 6 is provided at the handle 3 to enable the worker to manipulate the manipulation switch 6 using the thumb of the worker with the remaining four fingers inserted in the open area 3*h*.

As exemplified in FIGS. 5 and 6, a manipulation part 60 of the manipulation switch 6 (which part is manipulated by the worker) may be provided to protrude from the outer surface, 31, of the handle 3. In this case, the manipulation part 60 is easily manipulated. In the example illustrated in FIG. 5, the manipulation part 60 protrudes further in the third direction DR3 than the surface 31*f* of the handle 3 which surface is on the third direction DR3 side of the handle 3. In the example illustrated in FIG. 6, the manipulation part 60 protrudes further in the fourth direction DR4 than the surface 31*u* of the handle 3 which surface is on the fourth direction DR4 side of the handle 3.

In the examples illustrated in FIGS. 5 and 6, the handle 3 is a fixed handle mounted on the door 2 unmovably relative to the door 2. Alternatively, the handle 3 may be a movable handle mounted on the door 2 movably relative to the door 2 (for example, a handle swingable about a swing axis).

In the example illustrated in FIG. 7, the manipulation switch 6 includes a first manipulation part 61 and a second manipulation part 62. The first manipulation part 61 switches the state of the switch valve 5 from the first state to the second state. The second manipulation part 62 switches the state of the switch valve 5 from the first state to the third state. The first manipulation part 61 is provided further on the first direction DR1 side than the second manipulation part 62. In this case, by manipulating the first manipulation part 61, which is provided on the first direction DR1 side, the worker is able to apply the first assist force to the door 2 in the first direction DR1. Also, by manipulating the second manipulation part 62, which is provided on the second direction DR2 side, the worker is able to apply the second assist force to the door 2 in the second direction DR2.

In the example illustrated in FIG. 7, the manipulation part 60, which includes the first manipulation part 61 and the second manipulation part 62, is supported by a manipulation-part support member 64 in a manner in which the manipulation part 60 is swingable about a first axis AT1, which is perpendicular to the first direction DR1. In the example illustrated in FIG. 7, a part of the manipulation-part support member 64 is embedded in the handle 3, and another part of the manipulation-part support member 64 protrudes from the outer surface 31 of the handle 3. In the example illustrated in FIG. 7, the first axis AT1 is provided on the outside of the handle 3. Alternatively, the first axis AT1 may be provided to cross the handle 3.

In the example illustrated in FIG. 7, upon pressing of the first manipulation part 61, the manipulation part 60 located a default position (in other words, neutral position) tilts about the first axis AT1 (see FIG. 1) in a first rotation direction R1 toward a first manipulation position. Upon manipulation of the manipulation part 60 to tilt to the first manipulation position, the state of the switch valve 5 is switched from the first state to the second state. In contrast, upon pressing of the second manipulation part 62, the manipulation part 60 located at the default position (in other words, neutral position) tilts about the first axis AT1 in a second rotation direction R2 (which is the direction opposite to the first rotation direction R1) toward a second manipulation position. Upon manipulation of the manipulation part 60 to tilt to the second manipulation position, the state of the switch valve 5 is switched from the first state to the third state.

The manipulation part 60 is preferably configured to automatically return to the default position from the first manipulation position (or the second manipulation position). In other words, the manipulation part 60 is preferably biased by a biasing member such as a spring in a direction from the first manipulation position (or the second manipulation position) toward the default position. In this case, if the worker removes the worker's fingers from the manipulation part 60, the manipulation part 60 automatically returns from the first manipulation position (or the second manipulation position) to the default position. Upon returning of the manipulation part 60 of the manipulation switch 6 to the default position, the state of the switch valve 5 returns to the first state from the second state or the third state.

In the example illustrated in FIG. 8, the manipulation switch 6 is a switch that switches the state of the switch valve 5 only by manipulating the manipulation part 60. Alternatively, the manipulation switch 6 may be a switch that switches the state of the switch valve 5 by manipulating the manipulation part 60 and manipulating the handle 3. In the example illustrated in FIG. 9, upon pressing of the manipulation part 60 and application of a manipulation force to the handle 3 in the first direction DR1, the state of the switch valve 5 is switched from the first state to the second state. In contrast, upon pressing of the manipulation part 60 and application of a manipulation force to the handle 3 in the second direction DR2, the state of the switch valve 5 is switched from the first state to the third state. Upon application of a manipulation force to the handle 3 in the first direction DR1 or the second direction DR2 with the manipulation part 60 un-pressed, the state of the switch valve 5 is kept at the first state.

In the example illustrated in FIG. 9, at least one manipulation of the manipulation switch 6 (more specifically, a manipulation of the manipulation part 60) is performable independently of the manipulation of the handle 3. This provides a greater degree of freedom on the timing to switch the state between the first state and the second state (or the third state). For example, while the door 2 is being moved, the manipulation switch 6 may be manipulated (for example, fingers may be removed from the manipulation switch 6) to switch the state of the switch valve 5 from the second state or the third state to the no-assist first state.

In the example illustrated in FIG. 9, upon application of a manipulation force to the handle 3 in the first direction DR1 or the second direction DR2, the handle 3 is moved relative to the door 2. In this case, a detection as to whether a manipulation force is being applied to the handle 3 in the first direction DR1 may be performed by a first sensor 66*a* (an example of which is a first proximity sensor). The first sensor 66*a* detects a movement of the handle 3 relative to the door 2. Also, a detection as to whether a manipulation force is being applied to the handle 3 in the second direction DR2 may be performed by a second sensor 66*b* (an example of which is a second proximity sensor). The second sensor 66*b* detects a movement of the handle 3 relative to the door 2.

Alternatively, a detection as to whether a manipulation force is being applied to the handle 3 in the first direction DR1 or the second direction DR2 may be performed by a load sensor embedded in the handle 3.

In the examples illustrated in FIGS. 1 to 9, upon release of pressing of the manipulation part 60 when the state of the switch valve 5 is the second state or the third state, the state of the switch valve 5 returns to the first state. Alternatively, the state of the switch valve 5 may be kept at the second state or the third state even if the pressing of the manipulation part 60 is released when the state of the switch valve 5 is the second state or the third state. In other words, the state of the switch valve 5 may be kept at the second state or the third state unless the manipulation part 60 is positively manipulated.

Switch Valve 5

The default state of the switch valve 5 is preferably the first state. More specifically, in a power-source disconnected state in which no power is supplied to the switch valve 5, the state of the switch valve 5 is preferably kept at the first state. In this case, when power is off (for example, at the time of power failure), the door 2 can be moved freely in the first direction DR1 or the second direction DR2.

An example of the switch valve 5 is a solenoid valve. In this case, by turning the state of a solenoid of the switch valve 5 into a conduction state, the state of the switch valve 5 is switched from the first state to the second state (or the third state). By turning the state of the solenoid of the switch valve 5 into a non-conduction state, the state of the switch valve 5 is kept at the first state. In the example illustrated in FIG. 1, the switch valve 5 includes a first solenoid 51 and a second solenoid 52. By performing a first manipulation to force the manipulation part 60 of the manipulation switch 6 toward the first manipulation position, the first solenoid 51 is electrically conducted. Upon electrical conduction of the first solenoid 51, the state of the switch valve 5 is switched from the first state to the second state (see FIG. 1). By performing a second manipulation to force the manipulation part 60 of the manipulation switch 6 toward the second manipulation position, the second solenoid 52 is electrically conducted. Upon electrical conduction of the second solenoid 52, the state of the switch valve 5 is switched from the first state to the third state (see FIG. 1). When the manipulation part 60 of the manipulation switch 6 is at the default position, the state of the switch valve 5 is kept at the first state.

In the example illustrated in FIG. 1, the switching between the first state and the second state and the switching between the first state and the third state are performed by a single switch valve 5. More specifically, the switch valve 5 realizes the following. (1) As exemplified in FIG. 1, the switch valve 5 realizes a no-assist state in which the first air chamber 41A and the first atmosphere release hole E1 are fluidally connected to each other, and the second air chamber 43A and the second atmosphere release hole E2 are fluidally connected to each other. (2) As exemplified in FIG. 2, the switch valve 5 realizes a first assist state in which the first air chamber 41A and the air supply source 91 are fluidally connected to each other, and the second air chamber 43A and the second atmosphere release hole E2 are fluidally connected to each other. (3) As exemplified in FIG. 4, the switch valve 5 realizes a second assist state in which the first air chamber 41A and the first atmosphere release hole E1 are fluidally connected to each other, and the second air chamber 43A and the air supply source 91 are fluidally connected to each other.

Alternatively, as exemplified in FIG. 10, the switching between the first state and the second state (or the switching between the first state and the third state) may be performed by a plurality of switch valves 5. In the example illustrated in FIG. 10, the switch valve 5 includes a first switch valve 5A and a second switch valve 5B. The first switch valve 5A is provided at the first fluid passage FP1, which connects the first air chamber 41A and the air supply source 91 to each other. The second switch valve 5B is provided at the second fluid passage FP2, which connects the second air chamber 43A and the air supply source 91 to each other.

In the example illustrated in FIG. 10, the first switch valve 5A and the second switch valve 5B realize the first state, in which the door 2 is permitted to move in the first direction DR1 or the second direction DR2 without the first assist force and the second assist force. More specifically, in the first state, the first switch valve 5A maintains a fluid connection state between the first air chamber 41A and the first atmosphere release hole E1. The second switch valve 5B maintains a fluid connection state between the second air chamber 43A and the second atmosphere release hole E2. Assume a case where the state of the plurality of switch valves 5, which include the first switch valve 5A and the second switch valve 5B, is the first state. In this case, if the worker manipulates the handle 3 in the first direction DR1 (or the second direction DR2), the door 2 is moved in the first direction DR1 (or the second direction DR2) without the first assist force.

In the example illustrated in FIG. 10, the first switch valve 5A and the second switch valve 5B realize the second state, in which the first assist force is applied to the door in the first direction DR1. More specifically, in the second state, the first switch valve 5A fluidally connects the first air chamber 41A to the air supply source 91 to cause air to be supplied into the first air chamber 41A. The second switch valve 5B fluidally connects the second air chamber 43A to the second atmosphere release hole E2. Assume a case where the state of the plurality of switch valves 5, which include the first switch valve 5A and the second switch valve 5B, is the second state. In this case, if the worker manipulates the handle 3 in the first direction DR1, the door 2 is moved in the first direction DR1 by a combination of the first assist force and the manipulation force of the worker.

In the example illustrated in FIG. 10, the first switch valve 5A and the second switch valve 5B realize the third state, in which the second assist force is applied to the door in the second direction DR2. More specifically, in the third state, the first switch valve 5A fluidally connects the first air chamber 41A to the first atmosphere release hole E1, and the second switch valve 5B fluidally connects the second air chamber 43A to the air supply source 91 to cause air to be supplied into the second air chamber 43A. Assume a case where the state of the plurality of switch valves 5, which include the first switch valve 5A and the second switch valve 5B, is the third state. In this case, if the worker manipulates the handle 3 in the second direction DR2, the door 2 is moved in the second direction DR2 by a combination of the second assist force and the manipulation force of the worker.

Air Cylinder 4

In the example illustrated in FIG. 1, the air cylinder 4 includes the first air cylinder 4A. The first air cylinder 4A includes the first air chamber 41A, the second air chamber 43A, and a first piston 44A. The first piston 44A is provided between the first air chamber 41A and the second air chamber 43A. The first air cylinder 4A may include a first rod 45A. The first rod 45A is connected to the first piston 44A.

In the example illustrated in FIG. 1, the first air cylinder 4A includes the first air chamber 41A, which is connectable to the air supply source 91 via the first fluid passage FP1, and the second air chamber 43A, which is connectable to the air supply source 91 via the second fluid passage FP2. The first piston 44A is driven by the pressure difference between the first air chamber 41A and the second air chamber 43A. The first rod 45A is movable together with the first piston 44A. The first rod 45A is directly connected to the door 2, or is indirectly connected to the door 2 via a mechanical transfer member such as a belt, a wire, a cable, and a gear.

In the example illustrated in FIG. 1, when the state of the switch valve 5 is the first state, the first air chamber 41A and the first atmosphere release hole E1 are fluidally connected to each other, and the second air chamber 43A and the second atmosphere release hole E2 are fluidally connected to each other. This configuration enables the first piston 44A and the first rod 45A to move relative to a body 40A of the first air cylinder 4A with substantially no resistance in response to a movement of the door 2 in the first direction DR1 or the second direction DR2. In the example illustrated in FIG. 2, when the state of the switch valve 5 is the second state, the first air chamber 41A and the air supply source 91 are fluidally connected to each other, and the second air chamber 43A and the second atmosphere release hole E2 are fluidally connected to each other. With this configuration, the first assist force is applied to the door 2 in the first direction DR1. In the example illustrated in FIG. 4, when the state of the switch valve 5 is the third state, the second air chamber 43A and the air supply source 91 are fluidally connected to each other, and the first air chamber 41A and the first atmosphere release hole E1 are fluidally connected to each other. With this configuration, the second assist force is applied to the door 2 in the second direction DR2.

In the example illustrated in FIG. 1, the number of air cylinders to apply the first assist force or the second assist force to the door 2 is one. Alternatively, as exemplified in FIG. 11, the number of air cylinders to apply the first assist force or the second assist force to the door 2 may be two or more. In other words, the air cylinder 4, which applies the first assist force or the second assist force to the door 2, may include the first air cylinder 4A and a second air cylinder 4B.

In the example illustrated in FIG. 11, the first air cylinder 4A includes the first air chamber 41A; a third air chamber 41B; the first piston 44A, which is provided between the first air chamber 41A and the third air chamber 41B; and the first rod 45A, which is connected to the first piston 44A. The second air cylinder 4B includes the second air chamber 43A; a fourth air chamber 43B; a second piston 44B, which is provided between the second air chamber 43A and the fourth air chamber 43B; and a second rod 45B, which is connected to the second piston 44B.

In the example illustrated in FIG. 11, the first air cylinder 4A includes the first air chamber 41A, which is connectable to the air supply source 91 via the first fluid passage FP1. The second air cylinder 4B includes the second air chamber 43A, which is connectable to the air supply source 91 via the second fluid passage FP2. In the example illustrated in FIG. 11, the first air chamber 41A is provided at the first air cylinder 4A. The first air chamber 41A is connected to the air supply source 91 at the time when the first assist force is applied to the door 2 in the first direction DR1. The second air chamber 43A is provided at the second air cylinder 4B. The second air chamber 43A is connected to the air supply source 91 at the time when the second assist force is applied to the door 2 in the second direction DR2. In the first embodiment, as exemplified in FIG. 1, the first air chamber 41A and the second air chamber 43A may be provided at a single first air cylinder 4A. As exemplified in FIG. 11, the first air chamber 41A and the second air chamber 43A may be provided separately at a plurality of air cylinders (4A and 4B).

Fluid Passage FP

In the examples illustrated in FIGS. 1, 10, and 11, the fluid passage FP includes the first fluid passage FP1, which fluidally connects the first air chamber 41A and the air supply source 91 to each other. In the examples illustrated in FIGS. 1 and 11, the switch valve 5 is provided at the first fluid passage FP1. In the example illustrated in FIG. 10, the first switch valve 5A is provided at the first fluid passage FP1.

In the examples illustrated in FIGS. 1, 10, and 11, the fluid passage FP includes the second fluid passage FP2, which fluidally connects the second air chamber 43A and the air supply source 91 to each other. In the examples illustrated in FIGS. 1 and 11, the switch valve 5 is provided at the second fluid passage FP2. In the example illustrated in FIG. 10, the second switch valve 5B is provided at the second fluid passage FP2.

In the examples illustrated in FIGS. 1, 10, and 11, the fluid passage FP includes a third fluid passage FP3. The third fluid passage FP3 fluidally connects the first air chamber 41A and the first atmosphere release hole E1 to each other. In the examples illustrated in FIGS. 1 and 11, the switch valve 5 is provided at the third fluid passage FP3. In the example illustrated in FIG. 10, the first switch valve 5A is provided at the third fluid passage FP3. Part of the third fluid passage FP3 and part of the first fluid passage FP1 may be commonized (for example, the fluid passage between the first air chamber 41A and the switch valve 5 is commonized).

In the examples illustrated in FIGS. 1, 10, and 11, the fluid passage FP includes a fourth fluid passage FP4. The fourth fluid passage FP4 fluidally connects the second air chamber 43A and the second atmosphere release hole E2 to each other. In the examples illustrated in FIGS. 1 and 11, the switch valve 5 is provided at the fourth fluid passage FP4. In the example illustrated in FIG. 10, the second switch valve 5B is provided at the fourth fluid passage FP4. Part of the fourth fluid passage FP4 and part of the second fluid passage FP2 may be commonized (for example, the fluid passage between the second air chamber 43A and the switch valve 5 is commonized). In the examples illustrated in FIGS. 1, 10, and 11, the second atmosphere release hole E2 is an atmosphere release hole different from the first atmosphere release hole E1. Alternatively, the second atmosphere release hole E2 and the first atmosphere release hole E1 may be identical to each other.

In the example illustrated in FIG. 11, the fluid passage FP includes a fifth fluid passage FP5 and a sixth fluid passage FP6. The fifth fluid passage FP5 fluidally connects the third air chamber 41B and a third atmosphere release hole E3 to each other. The sixth fluid passage FP6 fluidally connects the fourth air chamber 43B and a fourth atmosphere release hole E4 to each other.

In the examples illustrated in FIGS. 1, 10, and 11, the air supply source 91 that supplies air to the first air chamber 41A is identical to the air supply source 91 that supplies air to the second air chamber 43A. Alternatively, the air supply source that supplies air to the first air chamber 41A may be different from the air supply source that supplies air to the second air chamber 43A. In other words, the number of air supply sources included in the door device 1A may be two or more. The air supply source 91 may be an air pump or a compressor.

First Regulator 71

In the examples illustrated in FIGS. 1, 10, and 11, the door device 1A includes the first regulator 71, which adjusts the pressure of the air supplied to the first air chamber 41A. The first regulator 71 is provided at the first fluid passage FP1 (more specifically, the fluid passage between the switch valve 5 and the first air chamber 41A). The first regulator 71 adjusts the first set pressure, which is the pressure of the air supplied to the first air chamber 41A. The first regulator 71 may be a reverse regulator that permits air to flow from the first air chamber 41A toward the switch valve 5 (in other words, a regulator with a reverse flow function).

Second Regulator 72

In the examples illustrated in FIGS. 1, 10, and 11, the door device 1A includes the second regulator 72, which adjusts the pressure of the air supplied to the second air chamber 43A. The second regulator 72 is provided at the second fluid passage FP2 (more specifically, the fluid passage between the switch valve 5 and the second air chamber 43A). The second regulator 72 adjusts the second set pressure, which is the pressure of the air supplied to the second air chamber 43A. The second set pressure may be set to the value of the first set pressure, or may be set to a value different from the first set pressure. The second regulator 72 may be a reverse regulator that permits air to flow from the second air chamber 43A toward the switch valve 5 (in other words, a regulator with a reverse flow function).

Thus, the door device 1A may include the first regulator 71 and the second regulator 72 different from the first regulator 71. In this respect, because of the layout of the door 2 of the machine tool, the shape of the door 2, and/or other causes, the assist force necessary for the opening motion of the door 2 may be different from the assist force necessary for the closing motion of the door 2. The door device 1A including the first regulator 71 and the second regulator 72 is capable of individually setting assist forces necessary for different motions.

Controller 8

The door device 1A may include a controller 8. The controller 8 controls a motion of the switch valve 5. In the example illustrated in FIG. 1, the controller 8 receives, from the manipulation switch 6, a manipulation detection signal indicating that the manipulation switch 6 has been manipulated. Then, the controller 8 transmits a control signal to the switch valve 5.

In response to a first manipulation, the manipulation switch 6 transmits a first manipulation detection signal to the controller 8. Upon receipt of the first manipulation detection signal, which indicates that the manipulation switch 6 has been subjected to the first manipulation, the controller 8 transmits a first control signal to the switch valve 5 to switch the state of the switch valve 5 from the first state to the second state. In a configuration in which the switch valve 5 includes the first solenoid 51, the first control signal may include a control command to electrically conduct the first solenoid 51. Alternatively, the first control signal may be a current itself to electrically conduct the first solenoid 51. Upon electrical conduction of the first solenoid 51, the state of the switch valve 5 is switched to the second state to fluidally connect the air supply source 91 and the first air chamber 41A to each other.

Upon receipt of the first manipulation detection signal continuously for a period of time exceeding the first threshold, the controller 8 may return the state of the switch valve 5 from the second state to the first state. In this case, the first assist force is prevented from being applied continuously due to, for example, an abnormality in the manipulation switch 6. Upon receipt of the first manipulation detection signal continuously for a period of time exceeding the first threshold, the controller 8 may emit an alarm. The emission of an alarm may include generation of warning sound, lighting of a warning lamp, or display of a warning message.

In response to a second manipulation, the manipulation switch 6 transmits a second manipulation detection signal to the controller 8. Upon receipt of the second manipulation detection signal, which indicates that the manipulation switch 6 has been subjected to the second manipulation, the controller 8 transmits a second control signal to the switch valve 5 to switch the state of the switch valve 5 from the first state to the third state. In a configuration in which the switch valve 5 includes the second solenoid 52, the second control signal may include a control command to electrically conduct the second solenoid 52. Alternatively, the second control signal may be a current itself to electrically conduct the second solenoid 52. Upon electrical conduction of the second solenoid 52, the state of the switch valve 5 is switched to the third state to fluidally connect the air supply source 91 and the second air chamber 43A to each other.

Upon receipt of the second manipulation detection signal continuously for a period of time exceeding a second threshold, the controller 8 may return the state of the switch valve 5 from the third state to the first state. In this case, the second assist force is prevented from being applied continuously due to, for example, an abnormality in the manipulation switch 6. Upon receipt of the second manipulation detection signal continuously for a period of time exceeding the second threshold, the controller 8 may emit an alarm. The second threshold is, for example, set to a value identical to the first threshold.

In response to the manipulation part 60 of the manipulation switch 6 returning to the default position, the signal from the manipulation switch 6 to the controller 8 is discontinued. Alternatively, in response to the manipulation part 60 of the manipulation switch 6 returning to the default position, the manipulation switch 6 may transmit a third manipulation detection signal to the controller 8. In response to a disconnection of the signal from the manipulation switch 6 (or in response to the third manipulation detection signal), the controller 8 transmits a third control signal to the switch valve 5. Instead of transmitting the third control signal to the switch valve 5, the controller 8 may stop transmitting the control signal to the switch valve 5. Upon receipt of the third control signal (or upon disconnection of the control signal), the switch valve 5 returns the state of the switch valve 5 to the first state.

In the above-described example, a motion of the switch valve 5 is controlled by the controller 8. Alternatively, a manipulation of the manipulation switch 6 may directly influence a motion of the switch valve 5. More specifically, the manipulation switch 6 and the switch valve 5 may be electrically connected to each other via an electric circuit, and a manipulation of the manipulation switch 6 may change the state of the electric circuit. In response to a change in the state of the electric circuit, the first solenoid 51 or the second solenoid 52 of the switch valve 5 may be driven.

Next, by referring to FIGS. 12 and 13, an example of the control performed by the controller 8 will be described. FIGS. 12 and 13 illustrate example control flows of a motion of the switch valve 5.

At first step ST1, the controller 8 determines whether the manipulation switch 6 has been subjected to a first manipulation or a second manipulation. Upon receipt of a first manipulation detection signal from the manipulation switch 6, the controller 8 determines that the manipulation switch 6 has been subjected to the first manipulation, and electrically conducts the first solenoid 51 (second step ST2). Upon receipt of a second manipulation detection signal from the manipulation switch 6, the controller 8 determines that the manipulation switch 6 has been subjected to the second manipulation, and electrically conducts the second solenoid 52 (eighth step ST8).

First step ST1 may be performable only when the door 2 is in an unlocked state. In other words, when the door 2 is in a locked state, first step ST1 may be prohibited.

At second step ST2, upon electrical conduction of the first solenoid 51, the state of the switch valve 5 is switched from the first state to the second state. As a result, the air cylinder 4 applies a first assist force to the door 2 in the first direction DR1.

At third step ST3, the controller 8 determines whether the continuation period of time of the first manipulation is a first threshold or less. In other words, the controller 8 determines whether the continuation period of time of receipt of the first manipulation detection signal is the first threshold or less. When the continuation period of time of the first manipulation is the first threshold or less, the procedure proceeds to sixth step ST6. In contrast, upon receipt of the first manipulation detection signal continuously for a period of time exceeding the first threshold, the controller 8 releases the electrical conduction of the first solenoid 51 (fourth step ST4). Upon release of the electrical conduction of the first solenoid 51, the state of the switch valve 5 returns to the first state from the second state. Upon receipt of the first manipulation detection signal continuously for a period of time exceeding the first threshold, the controller 8 may emit an alarm (fifth step ST5).

At sixth step ST6, the controller 8 determines whether the first manipulation has ended. In other words, the controller 8 determines whether the receipt of the first manipulation detection signal has discontinued. When the first manipulation has not ended yet, the procedure returns to third step ST3. When the first manipulation has ended, the controller 8 releases the electrical conduction of the first solenoid 51 (seventh step ST7) to end the application of the first assist force. Then, the controller 8 may perform first step ST1 again.

At eighth step ST8, upon electrical conduction of the second solenoid 52, the state of the switch valve 5 is switched from the first state to the third state. As a result, the air cylinder 4 applies a second assist force to the door 2 in the second direction DR2.

At ninth step ST9, the controller 8 determines whether the continuation period of time of the second manipulation is a second threshold or less. In other words, the controller 8 determines whether the continuation period of time of receipt of the second manipulation detection signal is the second threshold or less. When the continuation period of time of the second manipulation is the second threshold or less, the procedure proceeds to twelfth step ST12. In contrast, upon receipt of the second manipulation detection signal continuously for a period of time exceeding the second threshold, the controller 8 releases the electrical conduction of the second solenoid 52 (tenth step ST10). Upon release of the electrical conduction of the second solenoid 52, the state of the switch valve 5 returns to the first state from the third state. Upon receipt of the second manipulation detection signal continuously for a period of time exceeding the second threshold, the controller 8 may emit an alarm (eleventh step ST11).

At twelfth step ST12, the controller 8 determines whether the second manipulation has ended. In other words, the controller 8 determines whether the receipt of the second manipulation detection signal has discontinued. When the second manipulation has not ended yet, the procedure returns to ninth step ST9. When the second manipulation has ended, the controller 8 releases the electrical conduction of the second solenoid 52 (thirteenth step ST13) to end the application of the second assist force. Then, the controller 8 may perform first step ST1 again.

Application of Braking Force in Second Direction DR2

Upon receipt of the first manipulation signal from the manipulation switch 6, the controller 8 switches the state of the switch valve 5 from the first state to the second state. As a result, the air cylinder 4 applies the first assist force to the door 2 in the first direction DR1. Then, upon ending of the receipt of the first manipulation signal, the controller 8 may switch the state of the switch valve 5 to cause the air cylinder 4 to apply a braking force to the door 2 in the second direction DR2. More specifically, upon ending of the receipt of the first manipulation signal, the controller 8 may switch the state of the switch valve 5 from the second state to the third state. Applying a braking force to the door 2 in the second direction DR2 shortens the distance over which the door 2 moves in the first direction DR1 due to inertia. It is to be noted that upon passing of a predetermined first setting period of time after the switch of the state of the switch valve 5 from the second state to the third state, the controller 8 may return the state of the switch valve 5 to the first state from the third state.

In the example illustrated in FIG. 12, the braking force may be applied in the second direction DR2 after, for example, the electrical conduction of the first solenoid 51 is released (in other words, after seventh step ST7). More specifically, after the electrical conduction of the first solenoid 51 is released, the controller 8 electrically conducts the second solenoid 52 only for the predetermined first setting period of time. As a result, air is supplied from the air supply source 91 into the second air chamber 43A, causing the braking force to be applied to the door 2 in the second direction DR2. Upon passing of the first setting period of time, the controller 8 releases the electrical conduction of the second solenoid 52.

Application of Braking Force in First Direction DR1

Upon receipt of the second manipulation signal from the manipulation switch 6, the controller 8 switches the state of the switch valve 5 from the first state to the third state. As a result, the air cylinder 4 applies the second assist force to the door 2 in the second direction DR2. Then, upon ending of the receipt of the second manipulation signal, the controller 8 may switch the state of the switch valve 5 to cause the air cylinder 4 to apply a braking force the door 2 in the first direction DR1. More specifically, upon ending of the receipt of the second manipulation signal, the controller 8 may switch the state of the switch valve 5 from the third state to the second state. Applying a braking force to the door 2 in the first direction DR1 shortens the distance over which the door 2 moves in the second direction DR2 by inertia. It is to be noted that upon passing of a predetermined second setting period of time after the switch of the state of the switch valve 5 from the third state to the second state, the controller 8 may return the state of the switch valve 5 to the first state from the second state.

In the example illustrated in FIG. 13, the braking force in the first direction DR1 may be applied after, for example, the electrical conduction of the second solenoid 52 is released (in other words, after thirteenth step ST13). More specifically, after the electrical conduction of the second solenoid 52 is released, the controller 8 electrically conducts the first solenoid 51 only for the predetermined second setting period of time. As a result, air is supplied from the air supply source 91 into the first air chamber 41A, causing the braking force to be applied to the door 2 in the first direction DR1. Upon passing of the second setting period of time, the controller 8 releases the electrical conduction of the first solenoid 51. It is to be noted that an example of the second setting period of time is identical in length to the first setting period of time.

Second Embodiment

Figure 14:
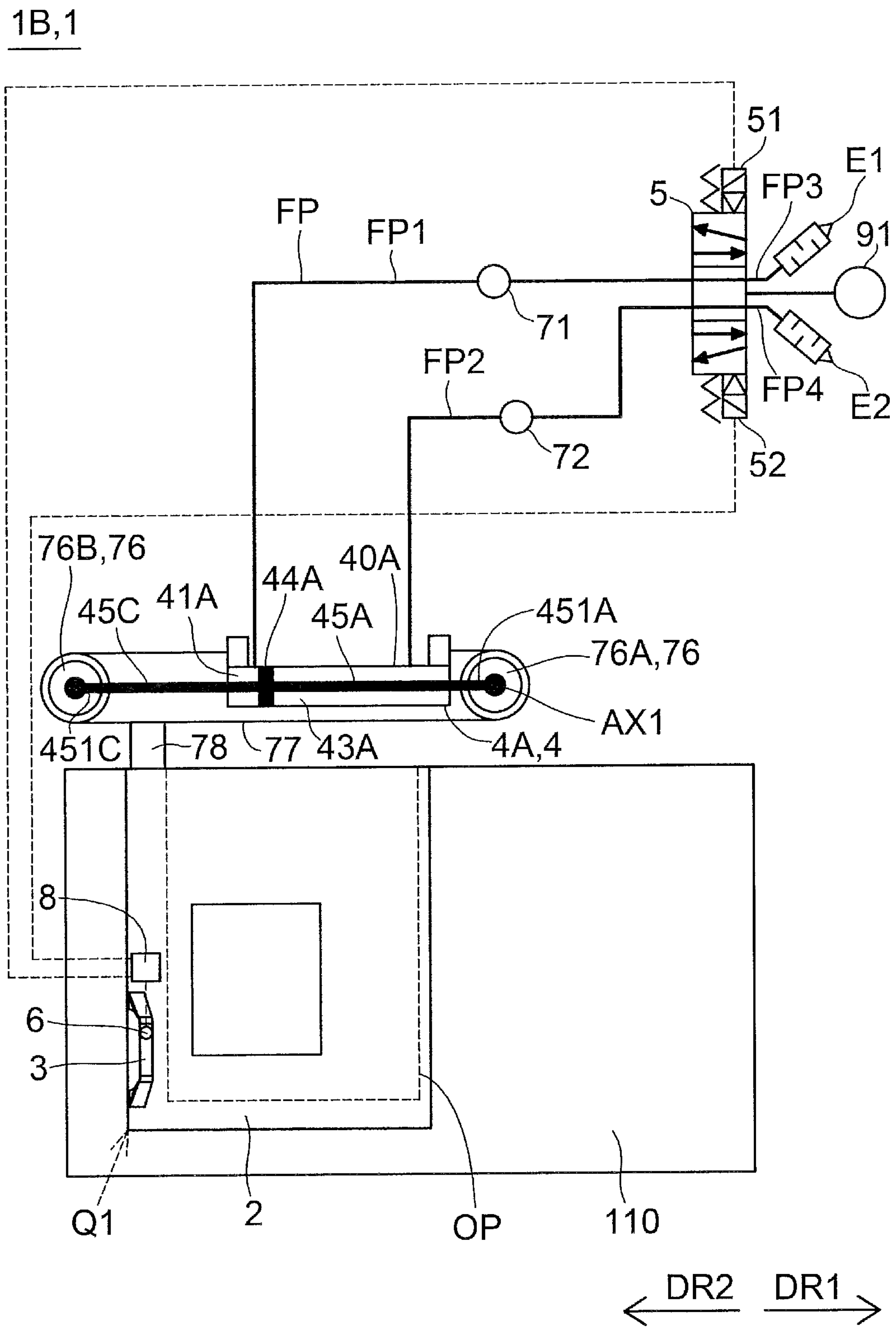
FIG. 14 is a diagram schematically illustrating a door device according to a second embodiment for a machine tool.
Figure 15:
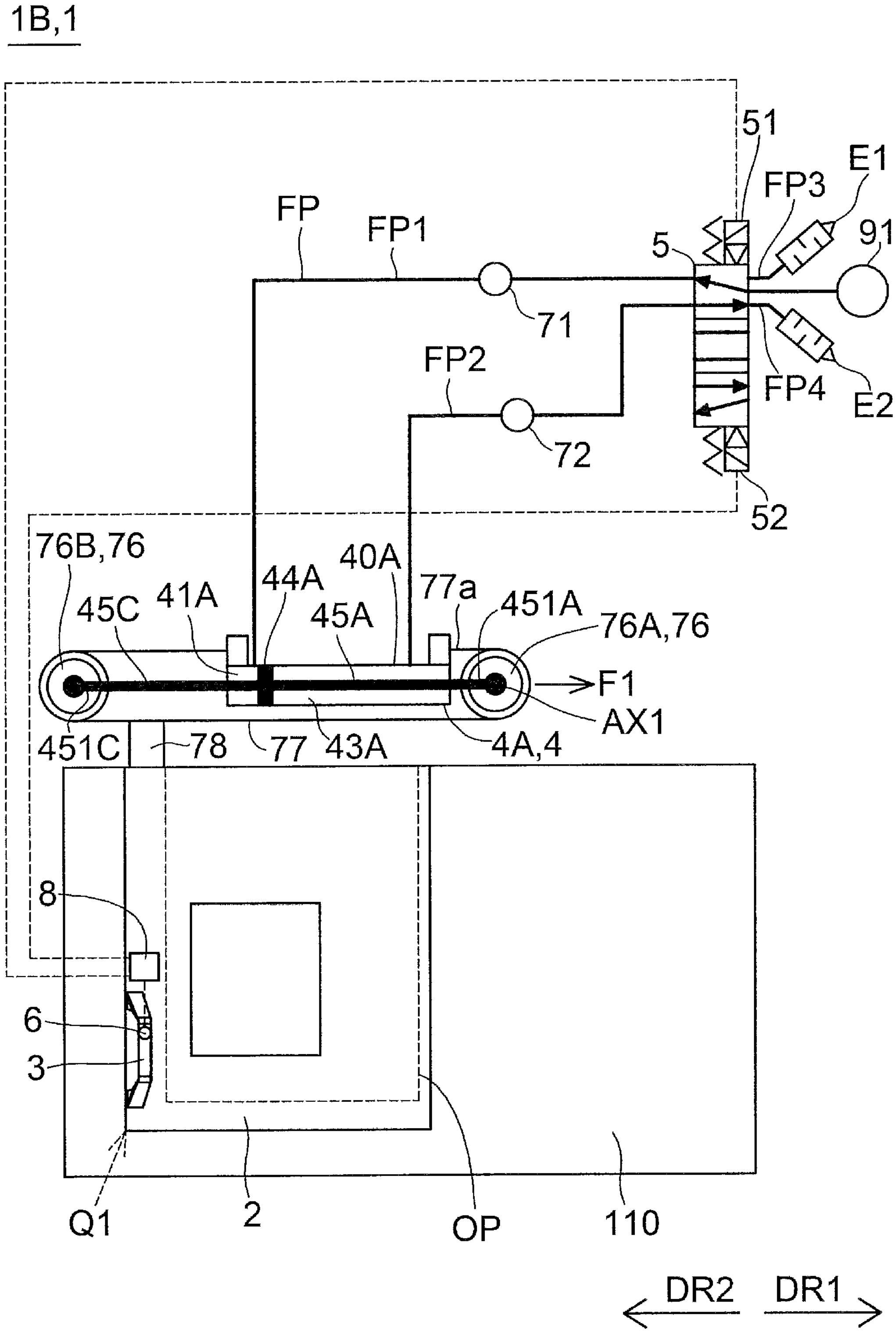
FIG. 15 is a diagram schematically illustrating the door device according to the second embodiment for a machine tool.
Figure 16:
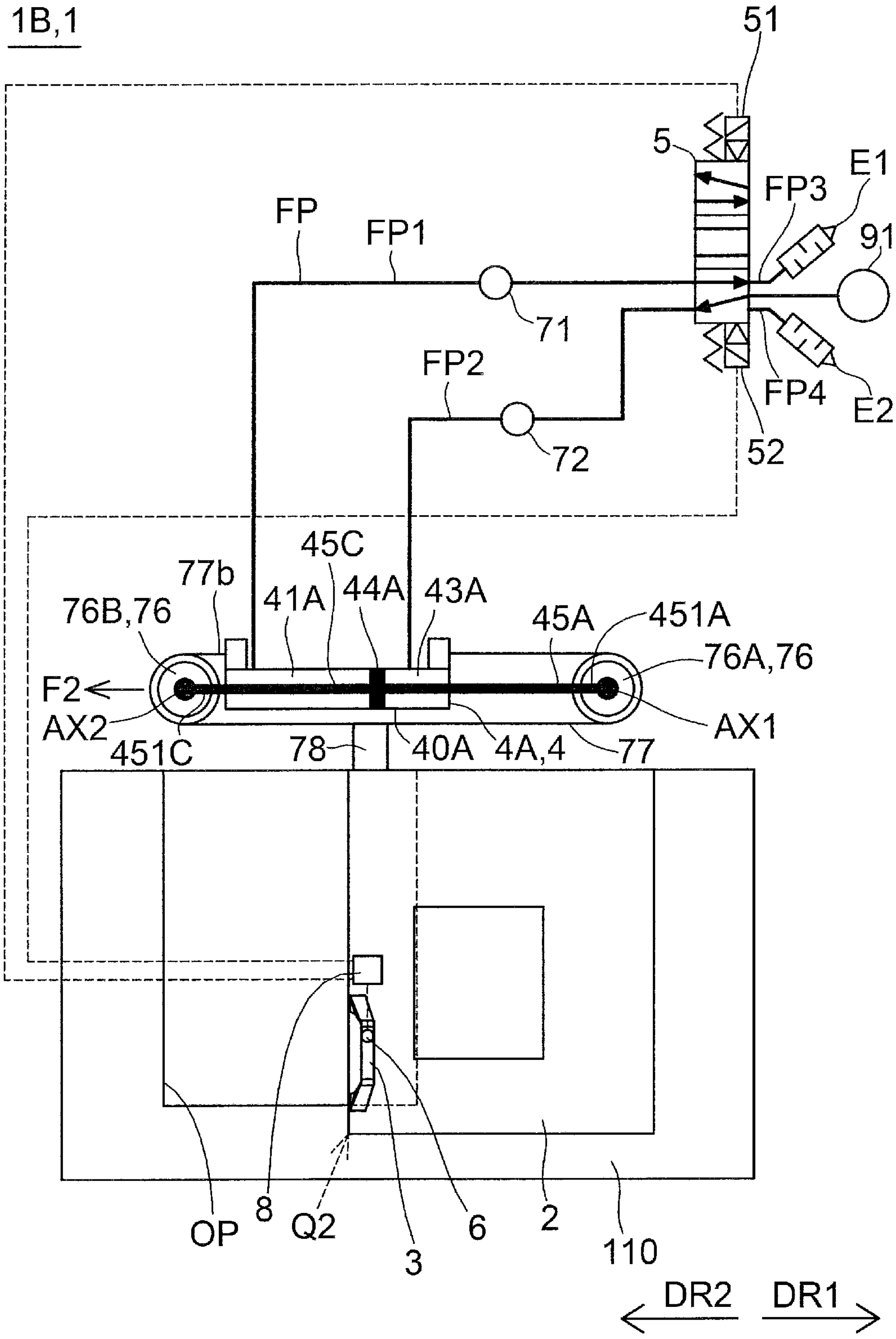
FIG. 16 is a diagram schematically illustrating the door device according to the second embodiment for a machine tool.
Figure 17:
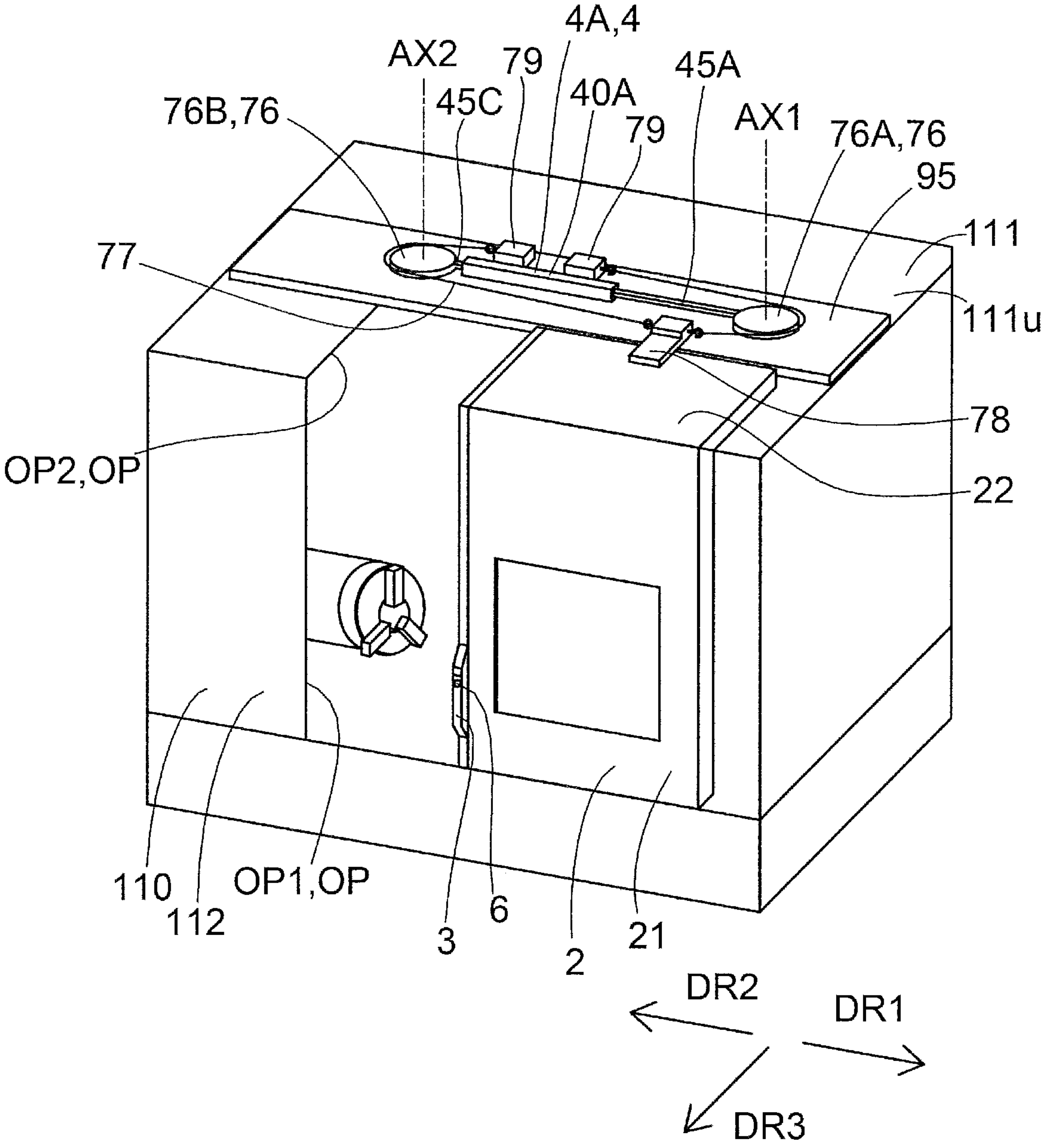
FIG. 17 is a diagram schematically illustrating an example installation of a movable pulley and/or a first air cylinder.

By referring to FIGS. 14 to 17, the door device 1B according to the second embodiment for a machine tool will be described. FIGS. 14 to 16 are diagrams schematically illustrating the door device 1B according to the second embodiment for a machine tool. FIG. 17 is a diagram schematically illustrating an example installation of a movable pulley 76 and/or the first air cylinder 4A.

The door device 1B according to the second embodiment for a machine tool is different from the door device 1A according to the first embodiment for a machine tool in that the door device 1B includes the movable pulley 76. In other respects, the door device 1B according to the second embodiment for a machine tool is similar to the door device 1A according to the first embodiment for a machine tool.

The following description of the second embodiment will mainly focus on those respects in which the second embodiment is different from the first embodiment. Those respects already described in the first embodiment will not be described in the second embodiment to avoid a repetition of description. Thus, it will be readily appreciated that those respects that are not explicitly described in the second embodiment but are described in the first embodiment apply in the second embodiment.

As exemplified in FIG. 14, the door device 1B according to the second embodiment for a machine tool includes the following. (1) A door 2. The door 2 is slidable between the first position Q1 and the second position Q2. The first position Q1 is a position at which the door 2 closes the opening OP of the housing 110, which defines the inner region of the machine tool. The second position Q2 (see FIG. 16) is a position at which the door 2 fully opens the opening OP. As shown in FIG. 16, when the door 2 fully opens the opening OP at the second position Q2, the opening area opened by the door 2 is maximum. (2) A handle 3. The handle 3 is provided at the door 2. (3) Air cylinder 4. The air cylinder 4 includes the first air chamber 41A and is configured to, by receiving air into the first air chamber 41A, apply a first assist force to the door 2 in a first direction DR1 from the first position toward the second position. (4) A fluid passage FP. The fluid passage FP includes a first fluid passage FP1. The first fluid passage FP1 connects the first air chamber 41A and the air supply source 91 to each other. (5) A switch valve 5. The switch valve 5 is provided at the fluid passage FP. (6) A manipulation switch 6. The manipulation switch 6 is configured to switch the state of the switch valve 5 between the first state and the second state. The first state is a state in which the door 2 is permitted to move without the first assist force in the first direction DR1 or the second direction DR2 from the second position toward the first position. The second state is a state in which the first assist force is applied to the door 2 in the first direction DR1.

With this configuration, the door device 1B according to the second embodiment for a machine tool provides effects similar to the effects provided by the door device 1A according to the first embodiment for a machine tool.

In the example illustrated in FIG. 14, the air cylinder 4 includes the first piston 44A, which is driven by the air supplied into the first air chamber 41A. More specifically, the air cylinder 4 includes the first air cylinder 4A. The first air cylinder 4A includes the first air chamber 41A, the second air chamber 43A, and the first piston 44A, which is provided between the first air chamber 41A and the second air chamber 43A. As exemplified in FIG. 14, when the state of the switch valve 5 is the first state, the first air chamber 41A and the first atmosphere release hole E1 are fluidally connected to each other, and the second air chamber 43A and the second atmosphere release hole E2 are fluidally connected to each other. As exemplified in FIG. 15, when the state of the switch valve 5 is the second state, the first air chamber 41A and the air supply source 91 are fluidally connected to each other, and the second air chamber 43A and the second atmosphere release hole E2 are fluidally connected to each other.

In the example illustrated in FIG. 15, the door device 1B includes the movable pulley 76. The movable pulley 76 converts a first displacement of the door 2 into a second displacement of the first piston 44A. The second displacement is smaller than the first displacement. For example, the second displacement is ½ of the first displacement.

In the example illustrated in FIG. 15, the door device 1B includes the movable pulley 76. With this configuration, the movement stroke of the first piston 44A is small as compared with the movement stroke of the door 2. As a result, the first air cylinder 4A can be made shorter in length. In a configuration in which the movement stroke of the first piston 44A is small, a first air cylinder 4A with a smaller diameter (in other words, a first piston 44A with a smaller diameter) can be employed. The fact that the first piston 44A has a smaller diameter means that the first piston 44A has a small area that contacts the air inside the air chambers (41A and 43A) (that is, the first piston 44A has a small pressure receiving area). The fact that the first piston 44A has a small pressure receiving area means that the assist force applied to the door 2 is less variable relative to changes in the internal pressure of the air chambers. In light of the considerations above, in a configuration in which the movement stroke of the first piston 44A is small, the pressure receiving area of the first piston 44A can be made small. As a result, a lower level of accuracy is required when the regulators (71 and 72) adjust pressure.

Next, by referring to FIGS. 14 to 17, description will be made with regard to optional configurations employable in the door device 1B according to the second embodiment for a machine tool.

First Movable Pulley 76A

In the example illustrated in FIG. 15, the movable pulley 76 includes a first movable pulley 76A. The first movable pulley 76A is supported by the first rod 45A (more specifically, a first end portion 451A of the first rod 45A) and rotatable about a first rotation axis AX1. A second end portion of the first rod 45A is connected to, for example, the first piston 44A.

As exemplified in FIG. 15, it will be assumed that the state of the switch valve 5 is the second state. In the example illustrated in FIG. 15, the first air chamber 41A is fluidally connected to the air supply source 91. In this case, upon supply of air into the first air chamber 41A, a first force F1 is applied to the first piston 44A, the first rod 45A, and the first movable pulley 76A in the first direction DR1.

In the example illustrated in FIG. 15, the door device 1B includes a flexible member 77. The flexible member 77 is guided by the first movable pulley 76A. The door 2 is directly or indirectly connected to the flexible member 77. In this case, upon application of the first force F1 to the first movable pulley 76A in the first direction DR1, the flexible member 77 applies, to the door 2, a first assist force that is half the degree of the first force F1.

It will be assumed that by a combination of the first assist force and the manipulation force of the worker, the door 2 is moved by the first displacement in the first direction DR1. In this case, the first movable pulley 76A, the first rod 45A, and the first piston 44A are moved in the first direction DR1 by a second displacement that is half the degree of the first displacement.

The flexible member 77 may be a linear material such as a wire and a cable, or may be a strip-shaped material such as a belt. In the example illustrated in FIG. 15, a first end portion 77*a* of the flexible member 77 is connected to the body 40A (in other words, the cylinder part) of the first air cylinder 4A. Alternatively, the first end portion 77*a* of the flexible member 77 may be connected to the housing 110.

Second Movable Pulley 76B

In the example illustrated in FIG. 16, the movable pulley 76 includes a second movable pulley 76B. The second movable pulley 76B is supported by a second rod 45C (more specifically, a first end portion 451C of the second rod 45C) and rotatable about a second rotation axis AX2. A second end portion of the second rod 45C is connected to, for example, the first piston 44A.

As exemplified in FIG. 16, it will be assumed that the state of the switch valve 5 is the third state. In the example illustrated in FIG. 16, the second air chamber 43A is fluidally connected to the air supply source 91. In this case, upon supply of air into the second air chamber 43A, a second force F2 is applied to the first piston 44A, the second rod 45C, and the second movable pulley 76B in the second direction DR2.

In the example illustrated in FIG. 16, the door device 1B includes a flexible member 77. The flexible member 77 is guided by the second movable pulley 76B. The door 2 is directly or indirectly connected to the flexible member 77. In this case, upon application of the second force F2 to the second movable pulley 76B in the second direction DR2, the flexible member 77 applies, to the door 2, a second assist force that is half the degree of the second force F2.

It will be assumed that by a combination of the second assist force and the manipulation force of the worker, the door 2 is moved by a third displacement in the second direction DR2. In this case, the second movable pulley 76B, the second rod 45C, and the first piston 44A are moved in the second direction DR2 by a fourth displacement that is half the degree of the third displacement.

In the example illustrated in FIG. 16, a second end portion 77*b* of the flexible member 77 is connected to the body 40A of the first air cylinder 4A. Alternatively, the second end portion 77*b* of the flexible member 77 may be connected to the housing 110.

In a case where a winder is provided to wind up an excessive length of wire or wind out more wire, the second movable pulley 76B may be omitted, or the second movable pulley 76B may be replaced with a fixed pulley.

Air Cylinder 4

The air cylinder 4 includes the first air cylinder 4A. In the example illustrated in FIG. 16, the number of air cylinders 4 included in the door device 1B is one. Alternatively, the number of air cylinders 4 included in the door device 1B may be two or more. In other words, as exemplified in FIG. 11, the air cylinder 4 may include the first air cylinder 4A and the second air cylinder 4B.

In the example illustrated in FIG. 16, the first air cylinder 4A is referred to as "double rod cylinder" in English. More specifically, the first air cylinder 4A includes the first rod 45A, which protrudes from a first end portion of the body 40A in the first direction DR1, and the second rod 45C, which protrudes from a second end portion of the body 40A in the second direction DR2. At a leading end portion of the first rod 45A, the first movable pulley 76A is provided. At a leading end portion of the second rod 45C, the second movable pulley 76B is provided. In the example illustrated in FIG. 16, the flexible member 77 is guided by both the first movable pulley 76A and the second movable pulley 76B. The first movable pulley 76A is provided at the leading end portion of the first rod 45A, and the second movable pulley 76B is provided at the leading end portion of the second rod 45C.

Arrangement of Movable Pulley 76

In the example illustrated in FIG. 17, the rotation axis of the movable pulley 76 is parallel to the vertical direction. More specifically, the first rotation axis AX1 of the first movable pulley 76A is parallel to the vertical direction, and the second rotation axis AX2 of the second movable pulley 76B is parallel to the vertical direction. This configuration makes the size of the movable pulley 76 compact in its height direction, and makes the entire size of the mechanism of applying assist force compact in the height direction of the mechanism.

In the example illustrated in FIG. 17, the movable pulley 76 is provided on the ceiling, 111, of the housing 110, which defines the inner region of the machine tool (more specifically, on the upper surface, 111*u*, of the ceiling 111). In this case, the configuration in which the rotation axis of the movable pulley 76 is parallel to the vertical direction makes the entire size of the machine tool compact in its height direction.

Arrangement of First Air Cylinder 4A

In the example illustrated in FIG. 17, the first air cylinder 4A is provided on the ceiling 111 of the housing 110, which defines the inner region of the machine tool (more specifically, the upper surface 111*u* of the ceiling 111). In this case, it is not necessary to increase the size of the housing 110 in plan view even though the first air cylinder 4A is added. Also in the above case, it is easy to provide an existing machine tool with a mechanism of applying assist force (such as the first air cylinder 4A). In the example illustrated in FIG. 17, the body 40A of the first air cylinder 4A (in other words, the cylinder part) is fixed to the ceiling 111. The arrangement of the first air cylinder 4A in FIG. 17 may be employed in the first embodiment.

In the example illustrated in FIG. 17, the body 40A of the first air cylinder 4A is provided not to overlap the movable pulley 76 in plan view. More specifically, the body 40A of the first air cylinder 4A and the movable pulley 76 (more specifically, the first movable pulley 76A and the second movable pulley 76B) are aligned on a single horizontal surface. This configuration makes the entire size of the mechanism of applying assist force compact in the height direction of the mechanism. In the example illustrated in FIG. 17, the first movable pulley 76A, the body 40A of the first air cylinder 4A, and the second movable pulley 76B are aligned on one line parallel to the horizontal surface.

First Connection Member 78

The door device 1B includes a first connection member 78. The first connection member 78 connects the door 2 and the flexible member 77 to each other. In the example illustrated in FIG. 17, the first connection member 78 is provided not to overlap the first air cylinder 4A in plan view. More specifically, the first air cylinder 4A and the first connection member 78 are aligned on the single horizontal surface. This configuration makes the entire size of the mechanism of applying assist force compact in the height direction of the mechanism. In the example illustrated in FIG. 17, the direction from the rear surface of the housing 110 toward the opening OP of the housing 110 is defined as the third direction DR3. In this case, the first connection member 78 is provided on the third direction DR3 side of the first air cylinder 4A.

Second Connection Member 79

The door device 1B may include at least one second connection member 79. The at least one second connection member 79 connects the ceiling 111 of the housing 110 and the flexible member 77 to each other. In the example illustrated in FIG. 17, the first air cylinder 4A and the at least one second connection member 79 are aligned on the single horizontal surface. While in the example illustrated in FIG. 17 the number of second connection members 79 is two, the number of second connection members 79 may be one or three or more. Also, in cases including a case where the flexible member 77 is an endless member, the second connection member 79 may be omitted.

Door 2

In the example illustrated in FIG. 17, the number of doors 2 is one. Alternatively, the number of doors 2 may be two or more. For example, the door 2 may include a first door and a second door. The first door is movable in the first direction DR1 to open one part of the opening OP. The second door is movable in the second direction DR2, which is opposite to the first direction DR1, to open an other part of the opening OP. In this case, each of the first door and the second door may be provided with a mechanism of applying assist force. The door 2 may also be a sliding door that includes a first panel and a second panel connected to the first panel and slidable relative to the first panel. In this case, when the opening OP is opened, the first panel and the second panel may be superimposed on each other; when the opening OP is closed, the second panel may be developed relative to the first panel to diminish the region over which the first panel and the second panel overlap. In this case, the second panel may be provided with the handle 3 with a mechanism of applying assist force to the second panel. It is to be noted that in the first or second embodiment, the number of doors 2 or the kind of the door 2 will not be limited to the above-described examples and is open to any other examples.

In the example illustrated in FIG. 17, the opening OP of the housing 110 includes a first opening OP1 and a second opening OP2. The first opening OP1 is formed on a front wall 112 of the housing 110. The second opening OP2 is formed on the ceiling 111 of the housing 110. Also in the example illustrated in FIG. 17, the door 2 includes a first plate 21 and a second plate 22. The first plate 21 closes the first opening OP1 of the front wall 112 of the housing 110. The second plate 22 closes the second opening OP2 of the ceiling 111 of the housing 110. In the example illustrated in FIG. 17, the door 2 has an approximately L-shaped cross-section perpendicular to the first direction DR1. It is to be noted that in the first or second embodiment, the shape of the door 2 will not be limited to the above-described examples and is open to any other examples.

Support Member 95

The door device 1B may include a support member 95. The support member 95 supports the air cylinder 4, the movable pulley 76, and the first connection member 78. In this case, by mounting the support member 95 on the ceiling 111, the air cylinder 4, the movable pulley 76, and the first connection member 78 can be provided on the ceiling 111.

Switch Valve 5

In the second embodiment, the switch valve 5 may have a configuration similar to the configuration of the switch valve 5 according to the first embodiment. In the example illustrated in FIG. 14, the number of switch valves 5 included in the door device 1B is one. Alternatively, the number of switch valves 5 included in the door device 1B may be two or more. For example, similarly to the example illustrated in FIG. 10, the switch valve 5 may include the first switch valve 5A and the second switch valve 5B.

Third Embodiment

Figure 18:
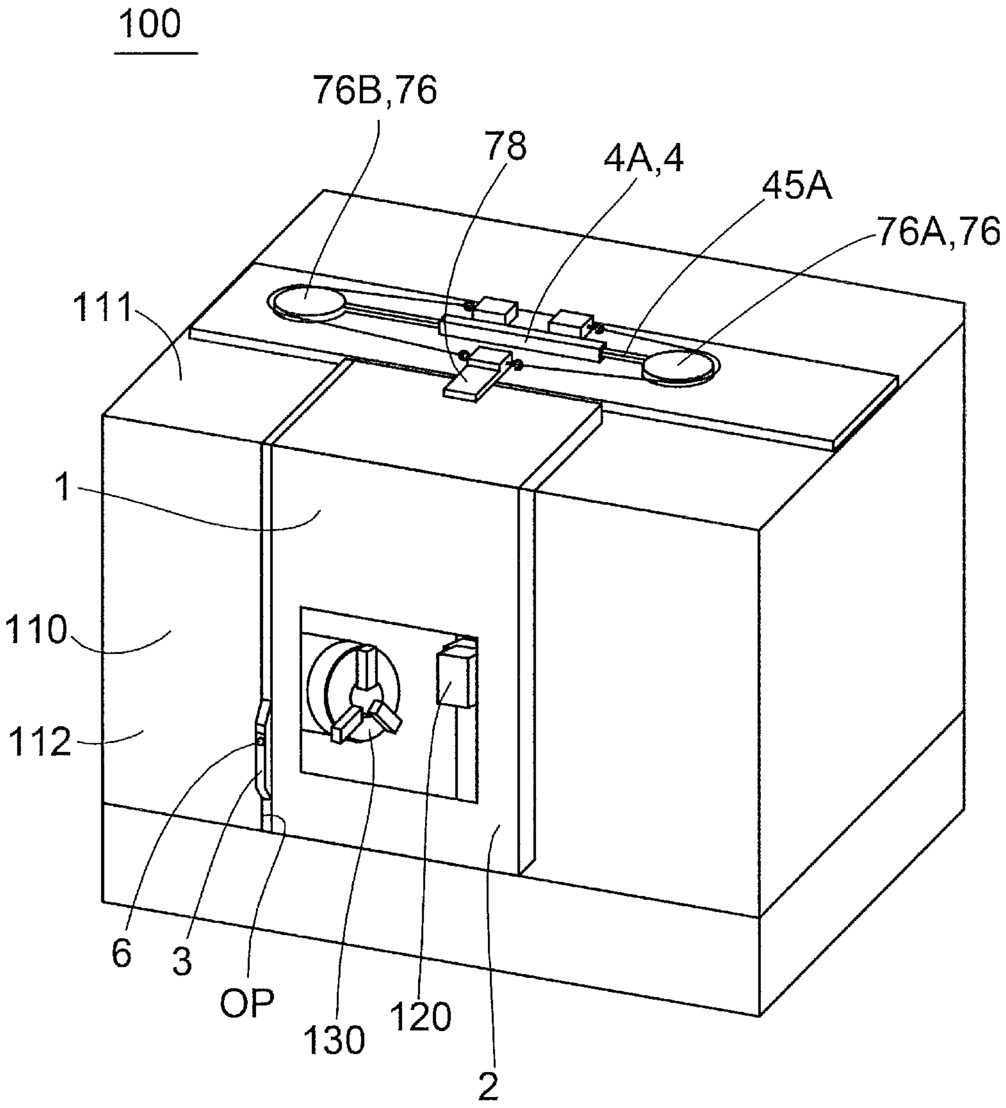
FIG. 18 is a schematic perspective view of a machine tool according to a third embodiment.

By referring to FIGS. 1 to 18, the machine tool 100 according to the third embodiment will be described. FIG. 18 is a schematic perspective view of the machine tool 100 according to the third embodiment.

The following description of the third embodiment will mainly focus on those respects in which the third embodiment is different from the 1 and 2 embodiments. In contrast, those respects already described in the first or second embodiment will not be described in the third embodiment to avoid a repetition of description. Thus, it will be readily appreciated that those respects that are not explicitly described in the third embodiment but are described in the first embodiment or the second embodiment apply in the third embodiment.

The machine tool 100 according to the third embodiment includes a machining device 120, a workpiece support device 130, the housing 110, and the door device 1.

The door device 1 may be the door device 1A according to the first embodiment, the door device 1B according to the second embodiment, or any other door device. The door device 1 includes the following. (1) A door 2. The door 2 is slidable between the first position Q1 and the second position Q2. The first position Q1 is a position at which the door 2 closes the opening OP of the housing 110. The second position Q2 is a position at which the door 2 fully opens the opening OP. When the door 2 fully opens the opening OP at the second position Q2, the opening area opened by the door 2 is maximum. (2) A handle 3. The handle 3 is provided at the door 2. (3) Air cylinder 4. The air cylinder 4 includes the first air chamber 41A and is configured to, by receiving air into the first air chamber 41A, apply a first assist force to the door 2 in a first direction DR1 from the first position toward the second position. (4) A fluid passage FP. The fluid passage FP includes a first fluid passage FP1. The first fluid passage FP1 connects the first air chamber 41A and the air supply source 91 to each other. (5) A switch valve 5. The switch valve 5 is provided at the fluid passage FP. (6) A manipulation switch 6. The manipulation switch 6 is configured to switch the state of the switch valve 5 between the first state and the second state. The first state is a state in which the door 2 is permitted to move without the first assist force in the first direction DR1 or the second direction DR2 from the second position toward the first position. The second state is a state in which the first assist force is applied to the door 2 in the first direction DR1.

The machining device 120 machines a workpiece. The machining device 120 is capable of holding a tool for machining the workpiece.

The workpiece support device 130 supports the workpiece machined by the machining device 120.

The housing 110 surrounds the machining device 120 and the workpiece support device 130. The housing 110 includes the opening OP. Prior to the machining performed by the machining device 120, the workpiece is inserted into the housing 110 through the opening OP. After the machining performed by the machining device 120 ends, the workpiece is taken through the opening OP.

The present invention will not be limited to the above-described and/or modifications; it will be appreciated that the embodiments may be modified or changed in any manner deemed convenient within the technical spirit and scope of the present invention. Also, the various techniques used in each of the embodiments and/or modifications are applicable in other embodiments and/or modifications insofar as no technical contradiction occurs. Further, the optional configurations in the embodiments and/or modifications may be omitted in any manner deemed convenient.

As used herein, the term "comprise" and its variations are intended to mean open-ended terms, not excluding any other elements and/or components that are not recited herein. The same applies to the terms "include", "have", and their variations.

As used herein, a component suffixed with a term such as "member", "portion", "part", "element", "body", and "structure" is intended to mean that there is a single such component or a plurality of such components.

As used herein, ordinal terms such as "first" and "second" are merely used for distinguishing purposes and there is no other intention (such as to connote a particular order) in using ordinal terms. For example, the mere use of "first element" does not connote the existence of "second element"; otherwise, the mere use of "second element" does not connote the existence of "first element".

As used herein, approximating language such as "approximately", "about", and "substantially" may be applied to modify any quantitative representation that could permissibly vary without a significant change in the final result obtained. All of the quantitative representations recited in the present application shall be construed to be modified by approximating language such as "approximately", "about", and "substantially".

As used herein, the phrase "at least one of A and B" is intended to be interpreted as "only A", "only B", or "both A and B".

Obviously, numerous modifications and variations of the present disclosure are possible in light of the above teachings. It is therefore to be understood that within the scope of the appended claims, the present disclosure may be practiced otherwise than as specifically described herein.

What is claimed is:

1. A door device of a machine tool, comprising:

a door provided to be slidable between a first position and a second position, the door at the first position being configured to close an opening in a housing of the machine tool, the door at the second position being configured to fully open the opening;

an air cylinder having a first air chamber to which air is configured to be supplied so as to apply a first assist force to the door in a first direction from the first position toward the second position;

a fluid passage having a first fluid passage connecting the first air chamber and an air supply source;

a switch valve provided at the fluid passage; and a manipulation switch configured to switch a state of the switch valve between a first state and a second state, the door, in the first state, being movable in the first direction and a second direction opposite to the first direction without the first assist force, the first assist force being applied to the door in the second state.

2. The door device according to claim 1, wherein, in the first state, the switch valve is configured to connect the first air chamber to a first atmosphere release hole through which the air in the first air chamber is released, and wherein, in the second state, the switch valve is configured to connect the first air chamber and the air supply source.

3. The door device according to claim 1, wherein the first assist force is smaller than a force necessary for sliding the door.

4. The door device according to claim 1, further comprising:

a handle which is provided on the door and via which the door is configured to be moved, wherein at least one manipulation of the manipulation switch is performable independently of a manipulation of the handle.

5. The door device according to claim 1, further comprising:

a handle which is provided on the door and via which the door is configured to be moved, wherein the manipulation switch is provided at the handle such that the manipulation switch is manipulable by a finger of a hand while the handle is held by the hand.

6. The door device according to claim 1, wherein the air cylinder has a second air chamber, wherein air is configured to be supplied to the second air chamber such that the air cylinder is configured to apply a second assist force to the door in the second direction, wherein the fluid passage includes a second fluid passage connecting the second air chamber and the air supply source, and wherein the manipulation switch is configured to switch the state of the switch valve between the first state and a third state, the door, in the first state, being movable in the first direction and the second direction without the first assist force and the second assist force, the second assist force being applied to the door in the third state.

7. The door device according to claim 2, wherein the air cylinder has a second air chamber, wherein air is configured to be supplied to the second air chamber such that the air cylinder is configured to apply a second assist force to the door in the second direction, wherein the fluid passage includes a second fluid passage connecting the second air chamber and the air supply source, wherein the manipulation switch is configured to switch the state of the switch valve between the first state and a third state, the door, in the first state, being movable in the first direction and the second direction without the first assist force and the second assist force, the second assist force being applied to the door in the third state, wherein, in the first state, the switch valve is configured to connect the first atmosphere release hole and the first air chamber and configured to connect the second air chamber to a second atmosphere release hole through which the air inside the second air chamber is released, and wherein, in the third state, the switch valve is configured to connect the first atmosphere release hole and the first air chamber and configured to connect the air supply source and the second air chamber.

8. The door device according to claim 6, wherein the second assist force is smaller than a force necessary for sliding the door.

9. The door device according to claim 6, wherein the manipulation switch comprises a first manipulation part configured to switch the state of the switch valve from the first state to the second state, and a second manipulation part configured to switch the state of the switch valve from the first state to the third state, and wherein the first manipulation part is provided further in the first direction than the second manipulation part.

10. The door device according to claim 6, further comprising:

a first regulator configured to adjust a pressure of the air supplied to the first air chamber to a first set pressure; and a second regulator configured to adjust a pressure of the air supplied to the second air chamber to a second set pressure.

11. The door device according to claim 1, further comprising:

a controller configured to switch the state of the switch valve from the first state to the second state upon receipt of a first manipulation detection signal which indicates that the manipulation switch has been subjected to a first manipulation, the controller being configured to return the state of the switch valve from the second state to the first state when a time period during which the controller continuously receives the first manipulation detection signal exceeds a first threshold.

12. The door device according to claim 1, further comprising:

a controller configured to switch the state of the switch valve from the first state to the second state upon receipt of a first manipulation detection signal which indicates that the manipulation switch has been subjected to a first manipulation, the controller being configured to switch the state of the switch valve to cause the air cylinder to apply a braking force to the door in the second direction upon ending of the receipt of the first manipulation detection signal.

13. The door device according to claim 1, further comprising:

a movable pulley, wherein the air cylinder has a first piston configured to be driven by the air supplied to the first air chamber, and wherein the movable pulley is configured to convert a first displacement of the door into a second displacement of the first piston, the second displacement being smaller than the first displacement.

14. The door device according to claim 13, wherein a rotation axis of the movable pulley is parallel to a vertical direction.

15. The door device according to claim 1, wherein the switch valve comprises a first switch valve, and a second switch valve.

16. The door device according to claim 1, wherein the air cylinder comprises a first air cylinder, and a second air cylinder.

17. A machine tool comprising:

a machining device configured to machine a workpiece;

a workpiece support device configured to support the workpiece;

a housing surrounding the machining device and the workpiece support device and having an opening; and a door device comprising:

a door provided to be slidable between a first position and a second position, the door at the first position being configured to close an opening in a housing of the machine tool, the door at the second position being configured to fully open the opening;

an air cylinder having a first air chamber to which air is configured to be supplied so as to apply a first assist force to the door in a first direction from the first position toward the second position;

a fluid passage having a first fluid passage connecting the first air chamber and an air supply source;

a switch valve provided at the fluid passage; and a manipulation switch configured to switch a state of the switch valve between a first state and a second state, the door, in the first state, being movable in the first direction and a second direction opposite to the first direction without the first assist force, the first assist force being applied to the door in the second state.

18. The machine tool according to claim 17, further comprising:

a handle which is provided on the door and via which the door is configured to be moved.

* * * * *